United States Patent
Yanagisawa et al.

(10) Patent No.: US 7,454,061 B2
(45) Date of Patent: Nov. 18, 2008

(54) SYSTEM, APPARATUS, AND METHOD FOR PROVIDING ILLEGAL USE RESEARCH SERVICE FOR IMAGE DATA, AND SYSTEM, APPARATUS, AND METHOD FOR PROVIDING PROPER USE RESEARCH SERVICE FOR IMAGE DATA

(75) Inventors: Hiroyuki Yanagisawa, Chiba (JP); Yasushi Yamamoto, Kanagawa (JP); Yoshiaki Nishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 770 days.

(21) Appl. No.: 10/876,051

(22) Filed: Jun. 25, 2004

(65) Prior Publication Data
US 2005/0008225 A1    Jan. 13, 2005

(30) Foreign Application Priority Data

| Jun. 27, 2003 | (JP) | ............................. 2003-185636 |
| Jun. 27, 2003 | (JP) | ............................. 2003-185690 |
| May 21, 2004  | (JP) | ............................. 2004-151265 |
| May 21, 2004  | (JP) | ............................. 2004-151474 |

(51) Int. Cl.
G06K 9/00 (2006.01)

(52) U.S. Cl. ............................. 382/181; 726/26; 705/52; 707/3

(58) Field of Classification Search ................. 382/100, 382/181, 190, 195, 305; 726/1–7, 26–33; 705/50, 51, 52, 57; 707/1, 2, 3, 100, 104.1, 707/205

See application file for complete search history.

(56) References Cited

U.S. PATENT DOCUMENTS

| 5,748,233   | A    | 5/1998  | Kitajima et al. |
| 6,067,116   | A    | 5/2000  | Yamano et al. |
| 6,647,128   | B1 * | 11/2003 | Rhoads ........................ 382/100 |
| 7,043,473   | B1 * | 5/2006  | Rassool et al. .................. 707/6 |
| 2002/0186844 | A1 * | 12/2002 | Levy et al. .................... 380/231 |
| 2004/0125982 | A1 * | 7/2004  | Kacker et al. ............... 382/100 |
| 2007/0002362 | A1 * | 1/2007  | Kacker et al. .............. 358/1.14 |

FOREIGN PATENT DOCUMENTS

| JP | 2000-215238 | 8/2000 |
| JP | 2001-216323 | 8/2001 |

* cited by examiner

Primary Examiner—Anand Bhatnagar
(74) Attorney, Agent, or Firm—Morrison & Foerster LLP

(57) ABSTRACT

In a system for providing an illegal use research service for image data, the image data received from a terminal apparatus is registered as a research subject, a research condition for research whether or not the image data being registered is illegally used by a Web site on the network is set, image data that are identical or similar to the image data being the research subject from a web site on the network are searched for based on a feature amount and the research condition, and a search result is informed as a research report to the research client using said terminal apparatus.

32 Claims, 26 Drawing Sheets

FIG.10A

| NO. | RESEARCH CLIENT NAME | REGISTERED DATE | TRADEMARK INFORMATION | AGREEMENT INFORMATION | VALID TERM | IMAGE INFORMATION | URL | REPORT INFORMATION | PREVIOUS RESEARCH DATE | ... |
|---|---|---|---|---|---|---|---|---|---|---|
| 1 | ○○ TRADING COMPANY | YYMMDD | a01 | k01 | YYMMDD | g01 | www.*** | YES | YYMMDD | ... |
| 2 | △△ ELECTRONICS | YYMMDD | a02 | k02 | YYMMDD | g02 | www.*** | NO | YYMMDD | ... |
| 3 | □□ CONSTRUCTION COMPANY | YYMMDD | b01 | k03 | YYMMDD | — | www.*** | YES | YYMMDD | ... |
| .. | .. | .. | .. | .. | .. | .. | .. | .. | .. | .. |

FIG.10B

| NO. | TRADEMARK | PRONUNCIATION | CATEGORY | IMAGE SIZE | LETTER TYPE | COLOR | PATTERN | DATA TYPE | ATTACHMENT | ... |
|---|---|---|---|---|---|---|---|---|---|---|
| a01 | ○○ | MARU | a | × | *** | *** | *** | *** | HP | ... |
| a02 | △△ | SANKAKU | b | × | *** | *** | *** | *** | CATALOG | ... |
| b01 | □□ | SHIKAKU | c | × | *** | *** | *** | *** | MANUAL | ... |
| .. | .. | .. | .. | .. | .. | .. | .. | .. | .. | .. |

FIG.11A

| NO. | COMPANY NAME | REGISTERED DATE | TRADEMARK INFORMATION | AGREEMENT INFORMATION | VALID TERM | URL | ... |
|---|---|---|---|---|---|---|---|
| 1 | AAA | YYMMDD | a01 | k01 | YYMMDD | www.*** | ... |
| 2 | BBB | YYMMDD | a02 | k02 | YYMMDD | www.*** | ... |
| 3 | RRR | YYMMDD | b01 | k03 | YYMMDD | www.*** | ... |
| : | : | : | : | : | : | : | : |

FIG.11B

| NO. | FORM NAME | REGISTERED DATE | FORM TYPE | SIMILARITY DEGREE | VALID TERM | ... |
|---|---|---|---|---|---|---|
| 1 | WARNING FORM | YYMMDD | K1 | A | YYMMDD | ... |
| 2 | ADVISORY FORM | YYMMDD | K2 | B | YYMMDD | ... |
| : | : | : | : | : | : | : |

FIG.11C

| SIMILARITY DEGREE | | ILLEGAL USE RESEARCH | | DISPLAY METHOD | ... |
|---|---|---|---|---|---|
| | | FORM TYPE | REGISTERED DATE | | |
| A | 80-100% | K1 | YYMMDD | INDIVIDUAL, DETAIL | ... |
| B | 30-79% | K2 | YYMMDD | INDIVIDUAL, SIMPLE | ... |
| C | 0-29% | K3 | YYMMDD | INTEGRATED, LOCATION | ... |
| : | : | : | : | : | : |

FIG.12

INTELLECTUAL PROPERTY MANAGEMENT-
SEARCH SERVICE LOGIN SCREEN

■PLEASE REGISTER AS A MEMBER IF YOU ARE NOT A MEMBER

[ OUR POLICY, MEMBER REGISTRATION ] ~41

■PLEASE SET RESEARCH SUBJECT IMAGE AND SELECT RESEARCH PURPOSE
(MEMBER REGISTRATION IS REQUIRED)

MEMBER ID : [_____] ~42
PASSWORD : [_____]

(CLICK HERE IF YOU FORGET YOUR ID AND PASSWORD)

■RESEARCH PURPOSE
○ ILLEGAL USE RESEARCH (RESEARCH ILLEGAL USE OF TRADEMARK etc.)
○ PROPER DEGREE RESEARCH
  (RESEARCH PROPER USE IN ACCORDANCE WITH REGULATION AND AGREEMENT)
○ DESIGN RESEARCH
  (REPORT CONCERNING DESIGN SIMILARITY OF PRODUCT etc.)

[ RESEARCH DETAIL SETTINGS ] ~44

INTELLECTUAL PROPERTY MANAGEMENT (IMAGE SEARCH SERVICE) REQUEST FORM

■RESEARCH SUBJECT IMAGE REGISTRATION
- CLICK REFER BUTTON TO SELECT IMAGE CHECK FOR RESEARCH SUBJECT
- CHECK FOR RESEARCH SUBJECT

☐REGISTER RESEARCH SUBJECT IMAGE: [      ] [REFER...]
FILE NAME: r_logo.gif
IMAGE FORMAT: GIF
IMAGE SIZE: 151 × 60 PIXEL
FILE CAPACITY: 2KB 51a ~ ABC ☐REGISTER RESEARCH SUBJECT IMAGE: [      ] [REFER...]
FILE NAME: r_logo_s.gif
IMAGE FORMAT: GIF
IMAGE SIZE: 100 × 40 PIXEL
FILE CAPACITY: 2KB 51b ~ ABC

■RESEARCH PERIOD: REPORT CYCLE
☐TRACE BACK (PERIOD WHEN IMAGE HAD BEEN DISPLAYED)
[2000▼]YEAR/[10▼]MONTH/[10▼]DAY ~ [2003▼]YEAR/[10▼]MONTH/[10▼]DAY

☐REPORT CYCLE / TIME (DISTRIBUTE REPORT PERIODICALLY)
[DAILY▼]YEAR × [1    ▼]TIME

■RESEARCH SUBJECT IMAGE
(SEARCH PARAMETERS: ENTIRE COLOR, COLOR DISTRIBUTION, EDGE, PATTERN)
☐REQUEST DATA TYPE("AND" SEARCH WHEN MULTIPLE SELECTIONS)
☐PHOTOGRAPH, ☐COMPANY MARK, ☐TRADEMARK, ☐LOGO, ☐e.t.c...

☐DIFFERENT COLOR OF MAIN ELEMENT (EXPECT FOR BACKGROUND COLOR)
○ SEARCH DIFFERENT COLOR / ○ IGNORE DIFFERENT COLOR

■FILE ATTRIBUTE (TO ALLOW BASED ON IMAGE QUALITY)
☐REQUEST DATA FORMAT ("OR" SEARCH WHEN MULTIPLE SELECTIONS)
☐JPEG(JPG), ☐GIF, ☐PNG

☐REQUEST DATA CAPACITY (FILE CAPACITY: MAXIMUM: 10,000KB)
[100  ▼]KB ~ [10000 ▼]KB

☐REQUEST DATA SIZE (ORIGINAL IMAGE SIZE: PIXEL)
LENGTH[      ]PIXEL (DOT) ~ WIDTH[      ]PIXEL (DOT)

■SITE ATTRIBUTE (TO LIMIT RESEARCH SUBJECT SITE)
☐DOMAIN TYPE (TO LIMIT RESEARCH SUBJECT FROM DOMAIN TYPE)
☐.co.jp, ☐.ne.jp, ☐.or.jp, ☐.gr.jp, ☐.jp, ☐.com, ☐.org, ☐.net, ☐.biz, ☐.info, ☐e.t.c...

☐PAGE TYPE (TO LIMIT RESEARCH SUBJECT FROM REGULAR PAGE TYPE)
☐TOP PAGE, ☐DOWNLOAD, ☐NEWS RELEASE, ☐PRODUCT (INFORMATION),
☐CUSTOMIZE, ☐ORGANIZATION INFORMATION, ☐EMPLOYMENT (INFORMATION),
☐IR: FINANCIAL INFORMATION, ☐ENVIRONMENTAL PRESERVATION,
☐SOCIAL CONTRIBUTION, ☐LINKS, ☐e.t.c...

☐PAGE LAYER (TO LIMIT RESEARCH SUBJECT FOR EACH LAYER FROM DOMAIN)
☐/ROUTE, ☐/(1)/2ND LAYER, ☐/(1)/(2)/3RD LAYER,
☐/(1)/(2)/(3)/4TH LAYER OR LOWER LAYER

[ SEARCH ] ~56

FIG.14

INTELLECTUAL PROPERTY MANAGEMENT: SEARCH RESULT DISPLAY

| SEARCHED IMAGE | IMAGE INFORMATION | ILLEGAL USE RESEARCH EXTRACT DIFFERENT COLOR OTHER THAN ABC SITE |
|---|---|---|
| | | SITE |
| ABC | ORIGINAL<br>FILE NAME: abc.gif<br>SIMILARITY DEGREE: 100%<br>IMAGE SIZE: 106 × 45 PIXEL<br>FILE CAPACITY: 4KB ~61 | |
| ABC | http://www.bbb.com/Images/Abc_logo.jpg<br>FILE NAME: abc_logo.jpg<br>SIMILARITY DEGREE: 58%<br>IMAGE SIZE: 100 × 43 PIXEL ~62<br>FILE CAPACITY: 14KB<br><br>SEND WARNING / ATTENTION E-MAIL:<br>[CREATE TEXT] | |
| ABC | http://www.ccc.com/abc/Abc_Logo3.gif<br>FILE NAME: abc.gif<br>SIMILARITY DEGREE: 42%<br>IMAGE SIZE: 150 × 58 PIXEL ~63<br>FILE CAPACITY: 1KB<br><br>SEND WARNING / ATTENTION E-MAIL:<br>[CREATE TEXT] | |
| ABC | http://www.ppp.co.uk/gifs/abc.gif<br>FILE NAME: abc.gif<br>SIMILARITY DEGREE: 27%<br>IMAGE SIZE: 100 × 100 PIXEL ~64<br>FILE CAPACITY: 2KB<br><br>SEND WARNING / ATTENTION E-MAIL:<br>[CREATE TEXT]↖64a | |

[REPORT REQUEST (ADDITIONAL CHARGE)]

FIG.15A

WARNING / ATTENTION E-MAIL CREATING FORM

| TEXT (PURPOSE) TYPE | —SELECT E-MAIL TYPE— ▼ | REGISTERED TEXT IS DISPLAY BELOW. |
|---|---|---|
| RECEIVER ADDRESS | —SELECT E-MAIL ADDRESS— ▼ | E-MAIL ADDRESSES INDICATED IN SITE ARE LISTED. |
| SENDER (TO REPLY) | yyy@abc.co.jp | REFERRED FROM MEMBER REGISTRATION INFORMATION. |
| E-MAIL TITLE | [ATTENTION] | MODIFY IF NECESSARY. |
| WARNING/ ATTENTION TEXT | YOU ARE REQUIRED TO HAVE USE PERMIT TO DISPLAY OUR COMPANY LOGO ON YOUR SITE, OR YOUR SITE SEEMS TO VIOLATE OUR USE REGULATION REGARDING FORM, COLOR, AND LOCATION. PLEASE STOP DISPLAYING OUR COMPANY LOGO IMMEDIATELY OR PLEASE DISPLAY OUR COMPANY LOGO IN ACCORDANCE WITH OUR USE REGULATION REGARDING FORM, COLOR, AND LOCATION.<br><br>ABC CORPORATION<br>TEL: 999-888-7777 / FAX: 999-888-6666 | MODIFY OR EDIT IF NECESSARY. |

[ CONFIRM ] — 71

WARNING / ATTENTION E-MAIL CREATING FORM

| TEXT (PURPOSE) TYPE | WARNING E-MAIL |
|---|---|
| RECEIVER ADDRESS | info@xxx.xxxx.co.jp |
| SENDER (TO REPLY) | yyy@abc.co.jp |
| E-MAIL TITLE | [ATTENTION]OUR COMPANY LOGO VIOLATES OUR USE REGULATION |
| WARNING/ ATTENTION TEXT | YOU ARE REQUIRED TO HAVE USE PERMIT TO DISPLAY OUR COMPANY LOGO ON YOUR SITE, OR YOUR SITE SEEMS TO VIOLATE OUR USE REGULATION REGARDING FORM, COLOR, AND LOCATION.<br>PLEASE STOP DISPLAYING OUR COMPANY LOGO IMMEDIATELY OR PLEASE DISPLAY OUR COMPANY LOGO IN ACCORDANCE WITH OUR USE REGULATION REGARDING FORM, COLOR, AND LOCATION.<br><br>ABC CORPORATION<br>TEL: 999-888-7777 / FAX: 999-888-6666 |

72 — BACK TO MODIFY    73 — SEND

INTELLECTUAL PROPERTY MANAGEMENT: SEARCH RESULT DISPLAY

| SEARCHED IMAGE | IMAGE INFORMATION | |
|---|---|---|
| ABC | ORIGINAL<br>FILE NAME: r_logo.gif<br>SIMILARITY DEGREE: 100%  ~81<br>IMAGE SIZE: 150 × 60 PIXEL<br>FILE CAPACITY: 2KB<br><br>e.t.c... | ILLEGAL USE RESEARCH<br><br>EXTRACT OTHER THAN LIST OF SITES HAVING USE PERMIT OR BEING OVERLOOKED |
| | | SITE |
| ABC | http://www.ccc.co.jp/ccc/images/abc_logo.gif<br>FILE NAME: abc_logo.gif<br>SIMILARITY DEGREE: 90%<br>IMAGE SIZE: 100 × 47 PIXEL  ~82<br>FILE CAPACITY: 3KB<br><br>e.t.c... | (site screenshot) |
| ABC | http://www.aaa.com/products/abc_logo.gif<br>FILE NAME: abc.gif<br>SIMILARITY DEGREE: 27%<br>IMAGE SIZE: 122 × 33 PIXEL  ~83<br>FILE CAPACITY: 3KB<br><br>e.t.c... | (site screenshot) |
| ABC | http://www.ttt.com/img/abc_logo.gif<br>FILE NAME: abc_logo.gif<br>SIMILARITY DEGREE: 52%  ~84<br>IMAGE SIZE: 91 × 35 PIXEL<br>FILE CAPACITY: 2KB<br><br>e.t.c... | (site screenshot) |

REPORT REQUEST (ADDITIONAL CHARGE)

FIG.17

INTELLECTUAL PROPERTY MANAGEMENT: SEARCH RESULT DISPLAY

| SEARCHED IMAGE | IMAGE INFORMATION | ILLEGAL USE RESEARCH |
|---|---|---|
|  | ORIGINAL<br>FILE NAME: 00_1.jpg<br>SIMILARITY DEGREE: 100%<br>IMAGE SIZE: 88 × 66 PIXEL<br>FILE CAPACITY: 2KB ~91 |  |
|  |  | SITE |
|  | http://auction.jp/image/xmas.jpg<br>FILE NAME: xmas.jpg<br>SIMILARITY DEGREE: 92%<br>IMAGE SIZE: 106 × 80 PIXEL ~92<br>FILE CAPACITY: 2KB<br>SITE INFORMATION: JAPAN/abc |  |
|  | def.auction.ne.jp/user/99_1.JPG<br>FILE NAME: 99_1.jpg<br>SIMILARITY DEGREE: 27%<br>IMAGE SIZE: 140 × 105 PIXEL ~93<br>FILE CAPACITY: 2KB<br>SITE INFORMATION: GERMANY/def |  |
|  | www.im.com/lv.jpg<br>FILE NAME: lv.jpg<br>SIMILARITY DEGREE: 66%<br>IMAGE SIZE: 200 × 150 PIXEL ~94<br>FILE CAPACITY: 10KB<br>SITE INFORMATION: ghi |  |

FIG.24

| NO. | COMPANY NAME | REGISTERED DATE | TRADE INFORMATION | AGREEMENT INFORMATION | VALID TERM | URL | PREVIOUS RESEARCH DATE | COUNSEL | MONITOR | |
|---|---|---|---|---|---|---|---|---|---|---|
| 1 | AAA | YYMMDD | a01 | k01 | YYMMDD | www.*** | YYMMDD | GOOD | YES | ... |
| 2 | BBB | YYMMDD | a02 | k02 | YYMMDD | www.*** | YYMMDD | GOOD | YES | ... |
| 3 | RRR | YYMMDD | b01 | k03 | YYMMDD | www.*** | YYMMDD | NOT GOOD | NO | ... |
| .. | .. | .. | .. | .. | .. | .. | .. | .. | .. | .. |

INTELLECTUAL PROPERTY MANAGEMENT (IMAGE SEARCH SERVICE) REQUEST FORM

151 — ■RESEARCH SUBJECT IMAGE REGISTRATION
- REFER BUTTON TO SELECT IMAGE CHECK FOR RESEARCH SUBJECT
- CHECK FOR RESEARCH SUBJECT

☐REGISTER RESEARCH SUBJECT IMAGE: [          ] [REFER...]
FILE NAME: r_logo.gif
IMAGE FORMAT: GIF
IMAGE SIZE: 151 × 60PIXEL          151a — ABC
FILE CAPACITY: 2KB ☐REGISTER RESEARCH SUBJECT IMAGE: [          ] [REFER...]
FILE NAME: r_logo_s.gif
IMAGE FORMAT: GIF
IMAGE SIZE: 100 × 40PIXEL          151b — ABC
FILE CAPACITY: 2KB 152 — ■RESEARCH SUBJECT IMAGE
(SEARCH PARAMETERS: ENTIRE COLOR, COLOR DISTRIBUTION, EDGE, PATTERN)

☐REQUEST DATA TYPE("AND" SEARCH WHEN MULTIPLE SELECTIONS)
☐PHOTOGRAPH, ☐COMPANY MARK, ☐TRADEMARK, ☐LOGO, ☐e.t.c...

☐DIFFERENT COLOR OF MAIN ELEMENT (EXPECT FOR BACKGROUND COLOR)
○ SEARCH DIFFERENT COLOR / ○ IGNORE DIFFERENT COLOR

153 — ■FILE ATTRIBUTE (TO ALLOW BASED ON IMAGE QUALITY)
☐REQUEST DATA FORMAT ("OR" SEARCH WHEN MULTIPLE SELECTIONS)
☐JPEG(JPG), ☐GIF, ☐PNG

☐REQUEST DATA CAPACITY (FILE CAPACITY: MAXIMUM: 10,000KB)
[100 ▼]KB ~ [10000 ▼]KB

☐REQUEST DATA SIZE (ORIGINAL IMAGE SIZE: PIXEL)
LENGTH[          ]PIXEL (DOT) ~ WIDTH[          ]PIXEL (DOT)

154 — ■RESEARCH SUBJECT SITE (TO LIMIT RESEARCH SUBJECT SITE)
☐PERMITTED SITE BY AGREEMENT BETWEEN YOUR COMPANY AND
  RELATED COMPANY SITE
  (EFFECTIVE TO PREVIOUSLY REFISTERED LIST ☐)
USE PERMIT SITE LIST: [          ] [REFER...] (CSV FORMAT)

☐DEALER NAME DEALING YOUR PRODUCT, SITE USING PRODUCT IMAGE WITHOUT
  USE PERMIT BUT BEING OVERLOOKED
  (EFFECTIVE TO PREVIOUSLY REGISTERED LIST ☐)
SITE LIST TO ALLOW
WITHOUT PERMISSION: [          ] [REFER...] (CSV FORMAT)

155 — ■DISPLAY ESTIMATE AMOUNT
(CALCULATE ESTIMATE AMOUNT BASED ON SETTING / SELECTED SEARCH CONDITION)
TOTAL ESTIMATE AMOUNT [          ] (EXCLUDING TAX)

[ SEARCH ] — 156

SYSTEM, APPARATUS, AND METHOD FOR PROVIDING ILLEGAL USE RESEARCH SERVICE FOR IMAGE DATA, AND SYSTEM, APPARATUS, AND METHOD FOR PROVIDING PROPER USE RESEARCH SERVICE FOR IMAGE DATA

BACKGROUND OF THE INVENTION

1. Field of the Invention

The present invention generally relates to a system, an apparatus, and a method for providing illegal use research service for image data, and more particularly to the system, the apparatus, and the method for providing illegal use research service for image data, which searching for similar images to the image data requiring the user permit.

In addition, the present invention generally relates to a system, an apparatus, and a method for providing proper use research service for image data, which research whether or not the image data which use is permitted are properly used.

2. Description of the Related Art

Conventionally, a trademark research service has been provided by a third-party organization. An objective of this trademark research service is to observe other trademarks in order to protect a trademark owned by an individual or an organization. This trademark research service periodically researches a new application or a newly registered trademark, and researches whether or not there is an identical or similar trademark (name, logo, naming) requested by a client. As a result, when there is an identical or similar trademark requested by a client, the result is summarized in a cut-paper form or a list form and then reported to the client.

As an example of the trademark research service, the client fills a trademark, name, and category, which are subject to research, in a request form, and sends the request form by fax or electronic mail. In this case, the client indicates one international classification as one search unit for one trademark, and can indicate three names for each trademark. Next, by a predetermined search condition, a search is always conducted automatically at a constant precision. All trademarks being identical or including identical part to the trademark requested by the client are output as a report. In a case of the similar trademark, 30 cases from higher priority are output as a report. Published trademark data and application data, which are weekly updated, are used for a search.

On the other hand, Japanese Laid-open Patent Application No. 2000-215238 discloses a method for detecting an illegal literary work or search for a similar image, in which a feature amount registered beforehand is compared with a feature amount obtained by a search and it is determined whether or not that searched work is an illegal literary work based on that comparison result. In this method, it is determined whether or not an URL (Uniform Resource Locator) a file name, a file size, a calculated hash value, and a like being obtained as the feature amount are identical to information registered to a feature amount DB (Database).

Japanese Laid-open Patent Application No. 2001-216323 discloses a system in that a similarity of a design is considered, comparison data relating to similarities of a plurality of attributes concerning a product design are maintained, and a search is conducted based on the comparison data.

However, in the above-described conventional trademark research service, since a search is conducted by utilizing a special DB provided and administrated by a specific organization, it is difficult to research other locations including other databases. Since only a text search can be conducted through the Internet or the like, it is impossible to search for a feature of image data itself.

In addition, in the above-described inventions disclosed by both Japanese Laid-open Patent Applications, a wider search can be possible by using an Internet search robot. However, since a similarity or a not-similarity is determined by using predetermined data, it is difficult to determine similarities derived from a file format difference, a modification difference, and a like. Accordingly, it is not possible to search effectively with a sufficient flexibility.

SUMMARY OF THE INVENTION

It is a general object of the present invention to provide a system, an apparatus, and a method for providing illegal use research service for image data, and a system, an apparatus, and a method for providing proper use research service for image data, in which the above-mentioned problems are eliminated.

A more specific object of the present invention is to provide a system, an apparatus, and a method for providing illegal use research service for image data, in which when an illegal use research is conducted for the image data requiring a user permit, a feature amount of the image data being a subject of the illegal use research can be calculated, image data being identical or similar to the image data being the subject of the illegal use research from Web based on the calculated feature amount, and the search result can be informed as a research report to a research client.

The above objects of the present invention are achieved by a system for providing an illegal use research service for image data, the system including: a server apparatus for conducting an illegal use research of the image data requiring a use permit; and a terminal apparatus used by a research client requesting the illegal use research, the terminal apparatus connectable to the server apparatus through a network, wherein the server apparatus includes: a research subject registering part registering the image data received from the terminal apparatus as a research subject to a research subject database for each research client; a research condition setting part setting a research condition for research whether or not the image data being registered is illegally used by a Web site on the network; a similar image searching part calculating a feature amount of the image data registered by the research subject registering part and searching for image data that are identical or similar to the image data being the research subject from a web site on the network based on the feature amount being calculated and the research condition; and a search result informing part informing a search result by the similar image searching part as a research report to the research client using the terminal apparatus.

The above objects of the present invention are achieved by a server apparatus for conducting an illegal use research of image data requiring a use permit, the server apparatus including: a research subject registering part registering image data received from the research client as a research subject to a research subject database for each research client; a research condition setting part setting a research condition for research whether or not the image data being registered are illegally used by a Web site on a network; a similar image searching part calculating a feature amount of the mage data registered by the research subject registering part, and searching for image data being identical or similar to the image data of the research subject based on the feature amount being calculated and the research condition; and a search result informing part informing a search result by the similar image searching part as a research report to the research client.

The above objects of the present invention are achieved by a method for providing an illegal use research service for image data by a server apparatus connectable to a client apparatus used by a research client requesting the illegal use research for the image data requiring a use permit through a network, the method including the steps of: registering image data received from the client apparatus as research subject to a research subject database for each research client; setting a research condition for researching whether or not the image data being registered are illegally used; calculating a feature amount of the image data being registered in the registering image data and searching for image data being identical or similar to the image data of the research subject based on the feature amount being calculated and the research condition; and informing a search result as a research subject to the research client using the terminal apparatus.

The above objects of the present invention are achieved by a program product for causing a computer to function as a system for providing an illegal use research service for image data, the program product including the codes for: functioning as a server apparatus for conducting an illegal use research of the image data requiring a use permit; and functioning as a terminal apparatus used by a research client requesting the illegal use research, including the codes for connecting to the server apparatus through a network, wherein the functioning as the server apparatus includes the codes for: registering the image data received from the terminal apparatus as a research subject to a research subject database for each research client; setting a research condition for research whether or not the image data being registered is illegally used by a Web site on the network; calculating a feature amount of the image data registered by registering the image data and searching for image data that are identical or similar to the image data being the research subject from a web site on the network based on the feature amount being calculated and the research condition; and informing a search result by the similar image searching part as a research report to the research client using the terminal apparatus.

The above objects of the present invention are achieved by a program product for causing a computer to function as a server apparatus for conducting an illegal use research of image data requiring a use permit, the program product including the codes for: registering image data received from the research client as a research subject to a research subject database for each research client; setting a research condition for research whether or not the image data being registered are illegally used by a Web site on a network; calculating a feature amount of the mage data registered by the registering image data, and searching for image data being identical or similar to the image data of the research subject based on the feature amount being calculated and the research condition; and informing a search result by the searching as a research report to the research client.

The above objects of the present invention are achieved by a program product for causing a computer to an illegal use research service for image data by a server apparatus connectable to a client apparatus used by a research client requesting the illegal use research for the image data requiring a use permit through a network, the program product including the codes for: registering image data received from the client apparatus as research subject to a research subject database for each research client; setting a research condition for researching whether or not the image data being registered are illegally used; calculating a feature amount of the image data being registered in the registering image data and searching for image data being identical or similar to the image data of the research subject based on the feature amount being calculated and the research condition; and informing a search result as a research subject to the research client using the terminal apparatus.

The above objects of the present invention are achieved by a computer-readable recording medium recorded with a program for causing a computer to an illegal use research service for image data by a server apparatus connectable to a client apparatus used by a research client requesting the illegal use research for the image data requiring a use permit through a network, the program including the codes for: registering image data received from the client apparatus as research subject to a research subject database for each research client; setting a research condition for researching whether or not the image data being registered are illegally used; calculating a feature amount of the image data being registered in the registering image data and searching for image data being identical or similar to the image data of the research subject based on the feature amount being calculated and the research condition; and informing a search result as a research subject to the research client using the terminal apparatus.

The above objects of the present invention are achieved by a system for providing a proper use research service for image data, the system including: a server apparatus for conducting a proper use research for researching whether or not image data being permitted to use is properly used; and a terminal apparatus used by a research client requesting the proper use research, the terminal apparatus connectable to the server apparatus through a network, wherein the server apparatus includes: a research subject registering part registering image data received as a research subject from the terminal apparatus and identification information of a Web site managed by a user who received a user permit of the image data for each research client to a research subject database; a research condition setting part setting a research condition for researching whether or not the image data being registered is properly used at a research subject Web site registering the identification information; a similar image searching part calculating a feature amount of the image data registered by the research subject registering part and searching for image data being identical or similar to the image data being the research subject based on the calculated feature amount and the research condition from the research subject Web site on the network; and a search result informing part informing a search result by the similar image searching part as a research report to the research client using the terminal apparatus.

The above objects of the present invention are achieved by a server apparatus for conducting a proper use research of image data permitted to use, the server apparatus including: a research subject registering part registering image data received from the research client-as a research subject to a research subject database for each research client; a research condition setting part setting a research condition for research whether or not the image data being registered are properly used by a research subject Web site on a network; a similar image searching part calculating a feature amount of the mage data registered by the research subject registering part, and searching for image data being identical or similar to the image data of the research subject based on the feature amount being calculated and the research condition; and a search result informing part informing a search result by the similar image searching part as a research report to the research client.

The above objects of the present invention are achieved by a method for providing a proper use research service for image data by a server apparatus connectable to a client apparatus used by a research client requesting the proper use research for the image data permitted to use through a network, the method including the steps of: registering image data received from the client apparatus as research subject to a research subject database for each research client; setting a research condition for researching whether or not the image data being registered are properly used; calculating a feature amount of the image data being registered in the registering image data and searching for image data being identical or similar to the image data of the research subject based on the feature amount being calculated and the research condition; and informing a search result as a research subject to the research client using the terminal apparatus.

The above objects of the present invention are achieved by a program product for causing a computer to function as a system for providing a proper use research service for image data, the program product including the codes for: functioning as a server apparatus for conducting a proper use research for researching whether or not image data being permitted to use is properly used; and functioning as a terminal apparatus used by a research client requesting the proper use research, including the codes for connecting to the server apparatus through a network, wherein the functioning as the server apparatus includes the codes for: registering part registering image data received as a research subject from the terminal apparatus and identification information of a Web site managed by a user who received a user permit of the image data for each research client to a research subject database; setting a research condition for researching whether or not the image data being registered is properly used at a research subject Web site registering the identification information; calculating a feature amount of the image data registered by the research subject registering part and searching for image data being identical or similar to the image data being the research subject based on the calculated feature amount and the research condition from the research subject Web site on the network; and informing a search result by the similar image searching part as a research report to the research client using the terminal apparatus.

The above objects of the present invention are achieved by a program product for causing a computer to conduct a proper use research of image data permitted to use, the program product including the codes for: registering image data received from the research client as a research subject to a research subject database for each research client; setting a research condition for research whether or not the image data being registered are properly used by a research subject Web site on a network; calculating a feature amount of the mage data being registered, and searching for image data being identical or similar to the image data of the research subject based on the feature amount being calculated and the research condition; and informing a search result by the similar image searching part as a research report to the research client.

The above objects of the present invention are achieved by a program product for causing a computer to execute a method for providing a proper use research service for image data by a server apparatus connectable to a client apparatus used by a research client requesting the proper use research for the image data permitted to use through a network, the program product including the codes for: registering image data received from the client apparatus as research subject to a research subject database for each research client; setting a research condition for researching whether or not the image data being registered are properly used; calculating a feature amount of the image data being registered in the registering image data and searching for image data being identical or similar to the image data of the research subject based on the feature amount being calculated and the research condition; and informing a search result as a research subject to the research client using the terminal apparatus.

The above objects of the present invention are achieved by a computer-readable recording medium recorded with a program for causing a computer to function as a system for providing a proper use research service for image data, the program product including the codes for: functioning as a server apparatus for conducting a proper use research for researching whether or not image data being permitted to use is properly used; and functioning as a terminal apparatus used by a research client requesting the proper use research, including the codes for connecting to the server apparatus through a network, wherein the functioning as the server apparatus includes the codes for: registering part registering image data received as a research subject from the terminal apparatus and identification information of a Web site managed by a user who received a user permit of the image data for each research client to a research subject database; setting a research condition for researching whether or not the image data being registered is properly used at a research subject Web site registering the identification information; calculating a feature amount of the image data registered by the research subject registering part and searching for image data being identical or similar to the image data being the research subject based on the calculated feature amount and the research condition from the research subject Web site on the network; and informing a search result by the similar image searching part as a research report to the research client using the terminal apparatus.

BRIEF DESCRIPTION OF THE DRAWINGS

In the following, embodiments of the present invention will be described with reference to the accompanying drawings.

FIG. 10A is a diagram showing an example of a client information management table registering information, which is the research subject, concerning the research client according to the first embodiment of the present invention, and FIG. 10B is a diagram showing an example of a trademark information management table registering information concerning a trademark according to the first embodiment of the present invention;

FIG. 11A is a diagram showing an example of an agreement information management table for registering information concerning an agreement, according to the first embodiment of the present invention, FIG. 11B is a diagram showing an example of a form management table for registering information concerning contents (message) of the warning e-mail, according to the first embodiment of the present invention, and FIG. 11C is a diagram showing an example of a similarity degree management table for registering information concerning the similarity degree being set to the image data, according to the first embodiment of the present invention;

FIG. 12 is a diagram showing an example of a service login screen in the illegal use research service providing system according to the first embodiment of the present invention;

FIG. 13 is a diagram showing an example of a research condition setting screen in the illegal use research service providing system according to the first embodiment of the present invention;

FIG. 14 is a diagram showing an example of a search result displaying screen in the illegal use research service providing system according to the first embodiment of the present invention;

FIG. 15A is a diagram showing a state of setting a text example in a warning/attention e-mail creating form according to the first embodiment of the present invention, and FIG. 15B is a diagram showing a state of additionally modifying the text example of the warning/attention e-mail creating form according to the first embodiment of the present invention;

FIG. 16 is a diagram showing another example of the search result displaying screen in the illegal use research service providing system according to the first embodiment of the present invention;

FIG. 17 is a diagram showing further example of the search result displaying screen in the illegal use research service providing system according to the first embodiment of the present invention;

FIG. 24 is a diagram showing an example of an agreement information management table for registering information concerning an agreement, according to the second embodiment of the present inventions; and FIG. 25 is a diagram showing an example of a research condition setting screen in the proper use research service providing system according to the second embodiment of the present invention.

DESCRIPTION OF THE PREFERRED EMBODIMENT

Figure 1:
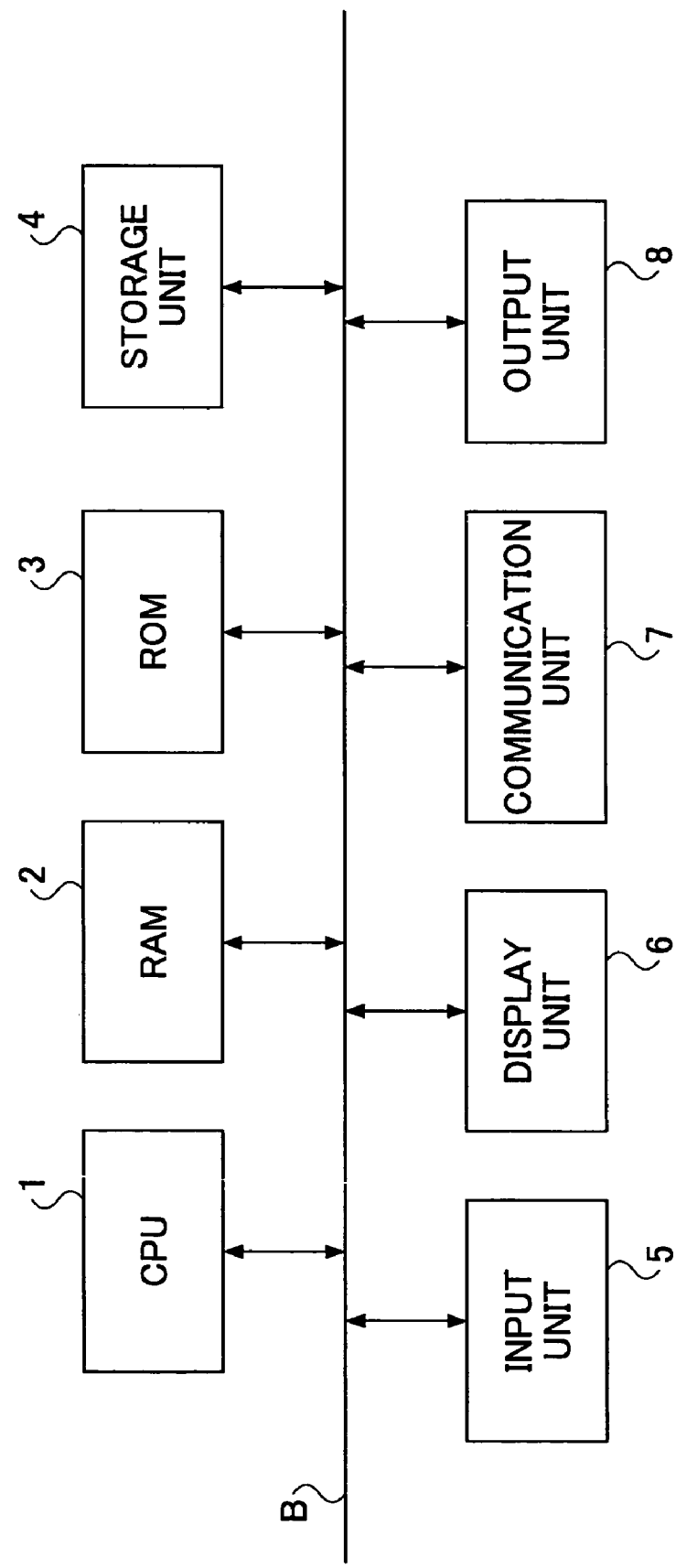
FIG. 1 is a block diagram showing an internal configuration of an information processing apparatus according to a first embodiment of the present invention.

FIG. 1 is a block diagram showing an internal configuration example of an information processing apparatus according to a first embodiment of the present invention. In FIG. 1, the information process apparatus includes a CPU (Central Processing Unit) 1, a RAM (Random Access Memory) 2, a ROM (Read-Only Memory) 3, a storage unit 3 such as a hard disk drive (HDD) or a like, an input unit 5, a display unit 6, a communication unit 7, an output unit 8, and a system bus 9. A server apparatus or a terminal unit according to an illegal use research service providing system of the present invention can be configured based on the information processing apparatus as shown in FIG. 1, that is, a general computer. Information processed in this system is temporarily accumulated in the RAM 2 at this process, and then, stored in the ROM 3. The CPU 1 reads out, modifies, and writes information being stored if necessary. In addition, a program causing the information processing apparatus to function as this system or an apparatus is stored in the ROM 3 or the storage unit 4, and accordingly read out and executed by the CPU 1. In addition, a process progress and a process result are displayed at the display unit 6 such as a CRT (Cathode Ray Tube), a LCD (Liquid Crystal, and a like to inform a user, and the user inputs necessary parameters by using the input unit 5 such as a keyboard, a mouse (pointing device), and a like.

In order for the user to easily operate the above-described program when the user uses at the display unit 6, the program may include a graphical user interface (GUI). The communication unit 7 communicates with other information processing apparatuses through a network or a like. It should be noted that the CPU 1, the RAM 2, the ROM 3, the storage unit 4, the input unit 5, the display unit 6, the communication unit 7, and the output unit 8 are connected via a system bus 9 and mutually accessible each other.

Figure 2:
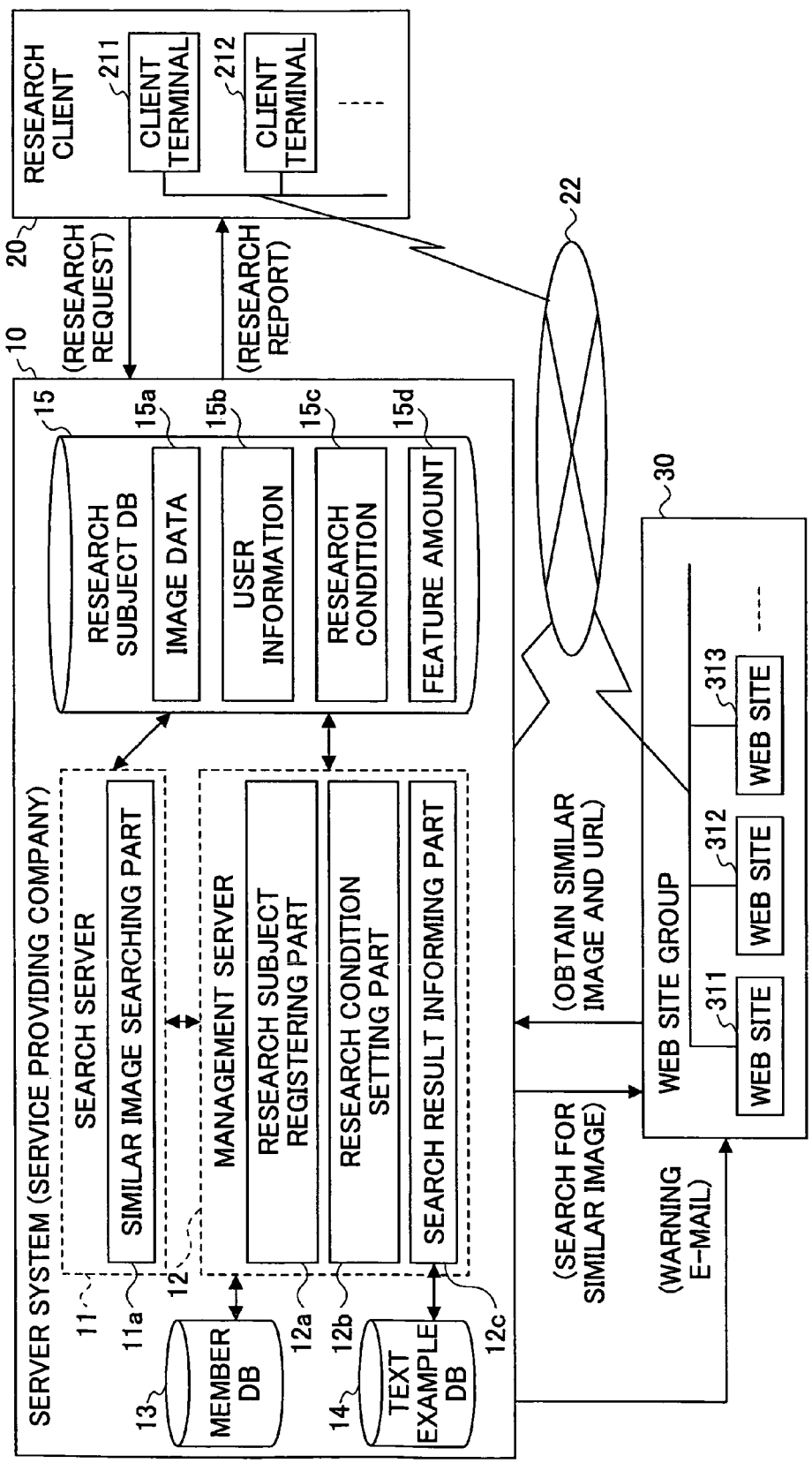
FIG. 2 is a diagram for explaining a configuration example of the illegal use research service providing system for image data, according to the first embodiment of the present invention.

FIG. 2 is a diagram for explaining a configuration example of the illegal use research service providing system for image data, according to the first embodiment of the present invention. In FIG. 2, a server system 10 is to provide an illegal use research service, and includes a search server 11 including a function for searching for a similar image, and a management server 12 including a function for managing information concerning a search subject. A member DB (Database) 13 is used to register member (research client) information. A text example DB (Database) 14 is used to register a text example for various notices to send by electronic mail. A research subject DB (Database) 15 is used to register image data or a like subject to research. A research client 20 is a user who sends a research request to server system 10 and receives a research report. Client terminals 211, 212, . . . (hereinafter, often called generally client terminal 211) are computer terminals used by the research clients 20. A network 22 is used to communicate to the server system 10. A web site group 30 is a group of Web sites 311, 312, 313, . . . (hereinafter, often called generally Web site 311) on the network 22.

The search server 11 includes a similar image searching part 11a that can access the research subject DB 15. The management server 12 includes a research subject registering part 12a, a research condition setting part 12b, and a search result informing part 12c, which can access the member DB 13, the text example DB 14, and the research subject DB 15. Moreover, the research subject DB 15 registers image data 15a subject to the illegal use research, user information 15b including identification information of a Web site managed by a user who receives a user permit of the image data 15a, a research condition 15c, and a feature amount 15d extracted from the image data 15a. For example, the identification information of the Web site included in the user information 15b shows a URL (Uniform Resource Locator) of the Web site. In this embodiment, the server system 10 is configured by these two servers: the search server 11 and the management server 12. Alternatively, these two servers maybe integrated in a single server computer. Alternatively, each function included in the server system 10 may be distributed to other server computers and terminal units through a network.

In the first embodiment of the illegal use research service providing system, the search server 11 and the management server 12 may be access the member DB 13, the text example DB 14, and the research subject DB 15 through a network or a like. That is, each of the member DB 13, the text example DB 14, and the research subject DB 15 may be physically separated from the search server 11 or the management server 12. Alternatively, each of the member DB 13, the text example DB 14, and the research subject DB 15 may be physically included in the search server 11 or the management server 12. Moreover, the search server 11 or the management server 12 stores a program for each function of the above-described parts.

Moreover, the server system 10, the client terminal 211, and the Web site 311 are connected through the network 22. Alternatively, a network between the server system 10 and the client terminal 211 may be different from a network between the server system 10 and the Web site 311. That is, in a case in that the Internet connected to a dedicated line being wired or wireless or a phone line is applied to a latter network, or in a case in that the Intranet utilizing an Internet technology or a dedicated line is sued for a former network, the latter network and the former network can be a WAN (Wide Area Network) or a MAN (Metropolitan Area Network), or a LAN (Local Area Network) depending on a place where the server system 10 is provided.

The illegal use research service providing system according to the present invention includes the search subject registering part 12a, the research condition setting part 12b, the similar image searching part 11a, the search result informing part 12c, the member DB 13, the text example DB 14, and the research subject DB 15. A research request form (including the image data and a research condition) sent from the client terminal 211 through the network 22 is registered to the research subject DB 15 by the management server 12 (the research subject registering part 12a and the research condition setting part 12b). The search server 11 (the similar image searching part 11a) searches for the similar image from a Web site group 30 based on the research request form being registered. The management server 12 (search result information part 12c) sends a search result to the client terminal 211.

In the following, the above-described each part will be described in detail.

First, the research subject registering part 12 sets and registers the image data 15a subject to a similar search (for example, picture data, design data, trademark data, name, trademark, logo, and a like) for each research client (organization, or a like) to the research subject DB 15. The image data 15a generally needs a use permit. In a case in that an agreement concerning a use of the image data 15a (for example, use policy or a like) exists, the user information 15b including information concerning the agreement (for example, a counterparty, a URL of the counterparty, a contact person name, an e-mail (electronic mail) address, a subject image, a use policy, or a like) is also registered to the research subject DB 15. Moreover, in a case of a new member registration, in addition to member (research client) information, the user information 15b (a use permit list, an URL that the user manages, the use policy, and the like) may be registered to the member DB 13. In this case, the search server 11 may be accessible to the research subject DB 15 and the member DB 13, and obtain necessary information for a similar image search.

In a general organization, a trademark application and a registered trademark are managed (monitored), and combinations of color, size, letter type, and background, which are permitted to user for a trademark, a name, a logo, and a like of the organization, are regulated in detail. The user (for example, a associated company, a dealer, a branch, an agent) permitted to use complies with these regulations, and shows a trademark, a name, a logo, and a like of the counterparty to a top page of a related home page (HP), a product, an advertisement, and a like. This use policy is set as an object to manage a uniform brand image involving the related company. Accordingly, it is possible for the related company to conduct a use management similarly to a parent company. In this case, only users of the related company and the like, which are permitted to use by the agreement, can use the trademark and the like.

The research condition setting part 12b sets the research condition 15c for research whether or not the image data 15a registered by the research subject registering part 12a is illegally used at the Web site group 30 on the network 22. That is, it is researched whether or not an intellectual property (for example, trademark, name, logo, and a like) set by the research client of this system and being subject to the similar search is used without notice, and then, the research condition 15c is set to prevent from being misidentified or confused by a similar display.

In a case of the illegal use research, in addition to extracting Web sites that probably use the intellectually property illegally, the server system 10 can send an alarm e-mail to a suspected Web site. Moreover, it is possible to indicate "all Web sites" or any type of files as the research subject. Furthermore, it is possible to extract image data similar to image data being research subject, and set a similarity degree based on each feature amount of the similar images being extracted, and display the similar images being sorted based on the similarity degree or display the similar images for each category.

Alternatively, the research condition setting part 12b may set the research condition 15c excluding a Web site registered in the research subject DB 15 and managed by the user from subjects of the illegal use research. That is, since the Web site (URL) registered in the research subject DB 15 is a Web site managed by the user permitted to use, it is considered that the illegal use research is not required. Accordingly, it is possible to effectively conduct the illegal use research by excluding from the subject of the illegal use research predetermined. Moreover, the research condition setting part 12b can set at least any one or some of a data format, a data capacity, and a data size of the image data being a subject of the illegal use research, and also, can set at least any one or some of a domain type, a page type, and a page layer of the Web site being the subject of the illegal use research. Moreover, the research condition setting part 12b sets and register, as the research condition 15c, a research range (the entire or a part of Web or a like), a research schedule (for example, a research is continuously conducted once per day for 6 months, or the like), a research result (for example, the warning e-mail is sent or not, or the like), and a country or a region being a research subject (such as America, China, Europe, or the like).

Furthermore, the research condition 15c will be described in detail.

The research condition 15c is a set of various conditions for improving a search effect by limiting a search range and it is possible to set the following items specifically. Moreover, since the research condition 15c is set in detail to limit the search range, it is possible to reduce a workload of this system and to adjust (discount) a cost of the research.

(1) subject period: this is a term for limiting time to research a test research subject image over pages including the research subject image on a published Web. For example, by limiting time to research, it is not required to trace back to a time before the research subject image was created or published, and it is possible to improve the search effect. A service user is not considered even if the service user used the research subject image before this subject period.

(2) research cycle: in a case of repeatedly researching periodically to monitor an illegal use, a cycle to monitor is set.

(3) type of test research subject image: a type of the test research subject image, for example, "photograph", "logo", "trademark", "illustration", "painting", or a like is indicated. By this indication, each search parameter (weight of feature amount) proper for each search subject is set. In a case in that this condition is not set (not indicated), an image registered as the research subject can be automatically determined, and the search parameter can be automatically determined. As described above, both a manual setting and an automatic setting can be conducted. For example, even if the research subject image is "photograph" and the research subject image is processed to modify to another type of an image and is illegally used, it is possible to identify the research subject image.

(4) color of main element: this is set to show whether or not the feature amount concerning "color" of research subject image and the test research subject. In a case in that a logo or a graphic trademark is illegally used, as a purpose for a third person to misidentify the logo or the graphic trademark, it is predicted to change the research subject image into a different image. For example, in a case in that the feature amount of the test research subject image other than features related to "color" shows a higher similarity degree but the feature amount concerning "color" shows quite dissimilar to the research subject image, the test research subject image can be highly concerned as an image being illegally used. By setting a detection parameter so as to include the feature amount concerning this "color", it is possible to detect the image being illegally used in this case.

(5) data format of test research subject: this is indicated to limit data formats (for example, JPG, GIF, PNG, BMP, or a like) of the test research subject. For example, in a case in that the research subject image is a photographic image of the JPG format, when converting into the GIF format, an image quality is degraded. In a case of overlooking an unauthorized use of a degraded image, by setting a different data format from the research subject image as the test research subject, it is possible to narrow the research range and improve the research effect. Moreover, if an image format that a Web browser can display is considered, the data format is limited to any one of the above four types. However, a TIFF format cannot be displayed at the Web browser but can be placed on the Internet to make it possible to download. If this case suffers a loss for an owner of the research subject image, the data format such as the TIFF format or the like which suffers a loss can be indicated.

(6) data capacity of test research subject image: this is set to limit the data capacity of the test research subject image. Similar to the data format of the test research subject image above item (5), if the data capacity is greatly changed from the research subject image, the test research subject image is considered to be different from an original. Accordingly, it is limited so that an image having the data capacity greatly different from the original is not considered as the research subject. Therefore, it is possible to further improve the search effect by this setting.

(7) domain type: a domain type subject to research is set. This is set to roughly limit forms of a research subject country and a research subject organization. For example, when an organization planning to expand its business to overseas researches a trademark similar to that of the organization beforehand, a domain other than JP domain may be indicated.

(8) page type: since generally, a Web site of an organization or a like includes a plurality of regular pages of "top page", "corporate profile", "What's New", or a like, a page type can be specified by using an analyzing technique of the Web site. Accordingly, it is possible to improve the search effect. For example, in a case in that a company logo of a company A as the research client is placed on "top page" of a home page of a company B having no relation to the company A, the company B probably introduces the company A or a product of the company A simply. Thus, a disbenefit degree to the company A is different at the page type. It is possible to consider the disbenefit degree based on the page type by setting the page type.

(9) page layer: this is indicated to limit a depth of the page layer from "top page" of the Web site begin the test research subject. Similar to the above (8) page type, the disbenefit degree is different depending on the page layer within the Web site. Accordingly, for example, by excluding pages placing on an extremely deeper layer, it is possible to improve the research effect.

The illegal use research is conducted under the above-described research condition 15c, that is, by properly combining the above (1) through (9). In this case, in response to the settings of the research condition 15c, an estimate calculating part (described later) is executed. Then, a research cost is estimated, and displayed. Alternatively, by inputting a budget for this research, the type of the research subject may be automatically determined, and a standard research condition may be automatically determined in response to the budget input by the research client.

The similar image searching part 11a of the search server 11 includes a part for calculating the feature amount 15d of the image data 15a registered by the research subject registering part 12a. The feature amount 15d calculated by this feature amount calculating part is registered with the image data 15a to the research subject DB 15. The similar image searching part 11a can extract the feature amount 15d from any one or some of a color, a pattern, a shape, and a layout of the image data 15a as the subject of the illegal use research. The similar image searching part 11a searches for image data identifying or resembling the image data 15a based on the research condition 15c and the feature amount 15d of the image data 15a set by the research condition setting part 12b from the Web site group 30.

Figure 3:
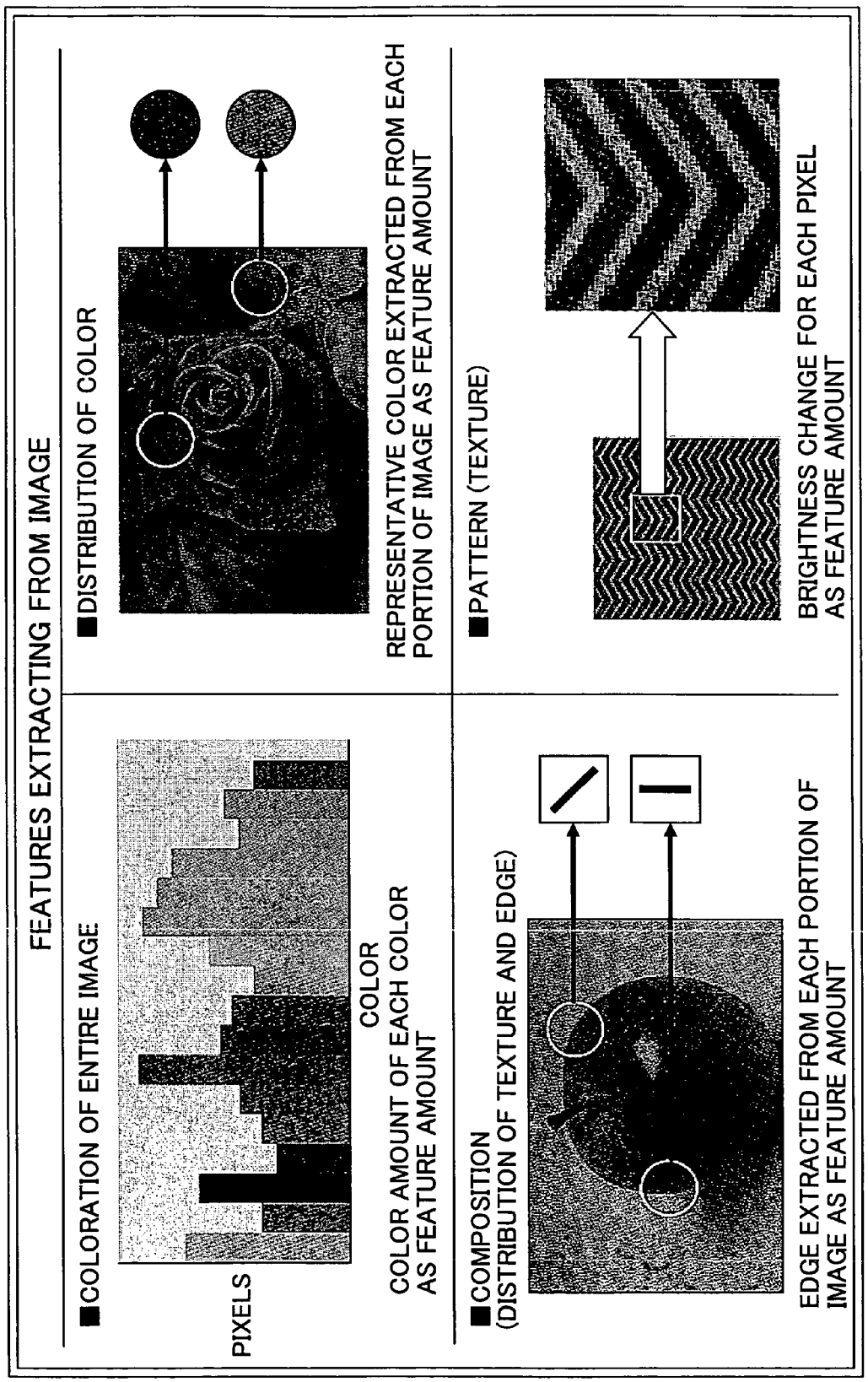
FIG. 3 is a diagram showing an example of the feature amount calculated by the feature amount calculating part according to the first embodiment of the present invention.

FIG. 3 is a diagram showing an example of the feature amount calculated by the feature amount calculating part according to the first embodiment of the present invention.

As shown in FIG. 3, the similar image searching part 11a automatically extracts and digitalizes a coloration of the entire image, a distribution of color, a composition (distribution of a texture and an edge), a pattern (texture) and a like at an image registration by the feature amount calculating part. Different from a search function utilizing a date, a keyword, a file name, and a like, the similar image searching part 11a searches for image by applying concepts such as the coloration (checks the number of pixels for each color to set as the feature amount), the distribution of color (defines a representative color extracted from each portion of the image as the feature amount), the composition (defines an edge extracted from each portion of the image), and the pattern (analyzes and defines a brightness change for each pixel as the feature amount) which are difficult to express by using character data.

The feature amount can be broadly categorized into four types, that is, a color system, an edge system, a shape system, and a pattern system.

1. Color System
   (a) color histogram: this is characterized by a composition and an amount of all colors.
   (b) main color: this is characterized by a main color composing the image.
   (C) coloration: this is characterized by a color location (location information) in the image.

2. Edge System
   (a) characterized by an edge amount and an angel distribution included in the image.
   (b) characterized by an edge amount, an angle distribution, and location information.

3. Shape System
   (a) curvature: characterized by a curved degree of an outer shape.
   (b) characterized by an oblateness and a moment of an object.

4. Pattern System
   (a) characterized by a distribution of a change amount of a tint.
   (b) characterized by a distribution and location information of a change amount of a tint.
   (c) characterized by a frequency characteristic obtained by the Fourier transform and the wavelet transform.

It should be noted that the feature amount including the location information in each explanation of the feature amount indicates a feature according to a shape.

In the following, characteristics of parameters and types of the research subject image will be described.

First, in most the graphic trademarks, since a color is irrelevant, a weight of the feature amount of "color system" is set to be lower and a weight of each feature amount of "edge system" and "shape system" is set to be higher so that the research is conducted effectively. Also, in a case of the graphic trademark, since there is less information concerning refined pattern and texture, a weight of the feature amount of "pattern system" may be set to be lower.

Different from the graphic trademark, a company logo and a company illustration often include color information and there is a case in that an image being a different color (identical shape but different color) is recognized as the same one. Accordingly, a weight of the feature amount of "color system" is changed to be higher or lower. In addition, since similar to the graphic trademark, there is less information concerning the refined pattern and texture for the company logo and illustration, a weight of the feature of "pattern system" may be set to be lower.

In an image and a painting such as works, since the entire image (including a background) has a meaning, all feature amounts described above are effective.

Furthermore, in photographic images of a person having a portrait right and a product, the features amounts of "color system", "shape system", and "pattern system" are effective. Regardless to the background, clothes, a light state at a time of taking a photograph, it is necessary to specify the person or the product within the image at higher priority. Accordingly, it is required to conduct a pre-process such as a process for separating the background before extracting the feature amount. In this system according to the present invention, the pre-process may be conducted. Also, in a case in that a photograph of a textile product or a like is the search subject, it is preferable to set the weight of the feature of "pattern system" to be higher, so that the research becomes effective.

Figure 4:
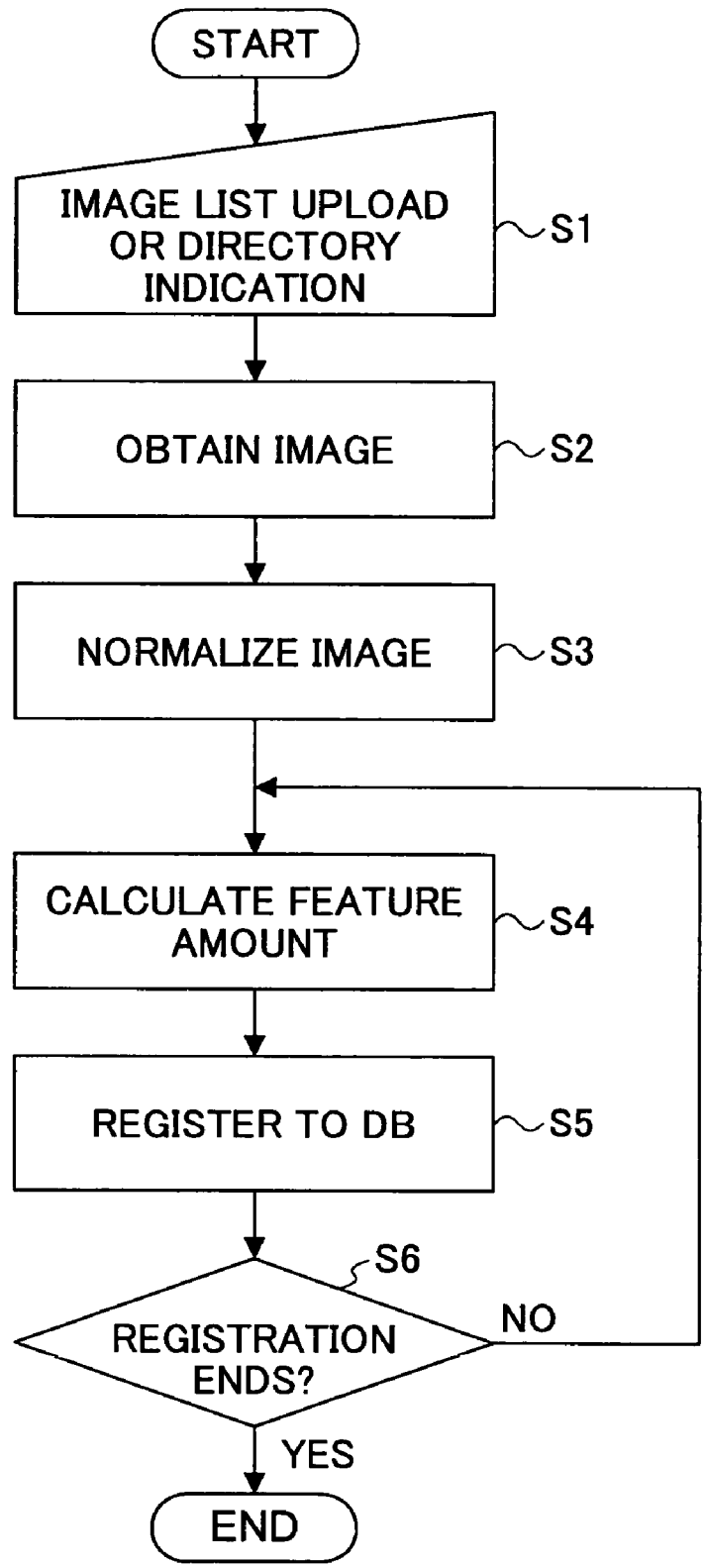
FIG. 4 is a flowchart for explaining an example of a feature amount calculating process conducted by the feature amount calculating part according to the first embodiment of the present invention.

FIG. 4 is a flowchart for explaining an example of a feature amount calculating process conducted by the feature amount calculating part according to the first embodiment of the present invention.

First, the search server 11 receives "network path" or "URL" where the image subject to register (called registration subject image) exists, and determines that the registration subject image is indicated when "network path" or "URL" being received is indicated (step S1).

In a method for indicating a registered image by a registration client, an image may be uploaded one by one or a plurality of images may be listed and uploaded. Alternatively, a directory indicating a location where the image is stored may be indicated or a directory list may be uploaded.

Next, the search server 11 obtains the registration subject image based on a indicated "network path" or "URL" (step S2), and normalizes the size (the number of pixels, an aspect ratio, and a like) of the registration subject image (step S3). Next, when the feature amount is extracted from the registration subject image being normalized and there are a plurality of patterns of feature amount (for example, the color system, the edge system, the shape system, and the pattern system), in response to a requested condition, the entire or necessary patterns are specified and an execution order for the patterns is determined, and the feature amount is calculated in response to its result (step S4). In a case in that a plurality of patterns for the feature amount are determined, the plurality of patterns are accordingly combined and each feature amount is calculated.

Next, the search server 11 registers input information that is received, a calculated pattern of the feature amount, and the calculation result to the research subject DB 15 by associating with each other (step S5). Subsequently, the search server 11 determines whether or not all images are registered (step S6). When all images are registered (YES), the search server 11 terminates the feature amount calculating process. On the other hand, when all images are not registered (NO), the search server 11 goes back to the step S4 to repeat the above-described steps.

Moreover, a detail process for searching a similar image can be realized in accordance with, for example, a method disclosed in Japanese Laid-open Patent Application No. 2002-245045 or other method being published, and a detail explanation thereof will be omitted.

Furthermore, when the similar image searching part 11a according to the first embodiment of the present invention searches for image data being identical or similar to the image data 15a, the similar image searching part 11a sets a predetermined range to the feature amount 15d of the image data 15a registered research subject DB 15, searches for image data including the feature amount within the predetermined range from the Web site group 30 on the network 22 as the similar image, and obtains the image data searched for as the similar image and a URL of the Web site including the image data.

By setting the predetermined range, a threshold is set to determine a range of the feature amount for recognizing similar image data. For example, a threshold is set for each feature amount of the research subject image, and the test research subject image is determined as a similar image if the feature amount of the test research subject image is within the threshold. Accordingly, since the threshold is set for each feature amount, it is possible to confirm a similarity degree with respect to an arbitrary feature amount. In addition, a predetermined range, that is, a threshold may be defined with respect to the similarity degree, which will be described. In this case, it is determined whether or not the similarity degree calculated based on the feature amount of the test research subject image is within a threshold. When the feature amount of the test research subject image is within the threshold, it is determined that the test research subject image is similar to the research subject image. Therefore, it is possible to confirm the similarity degree in a view of the entire image.

In this system, by setting the above-described thresholds, it is possible to adjust each weight by using a combination of a plurality of the feature amount such as "color system", "edge system", "shape system", and "pattern system". In a case of adjusting the weight of each feature amount, since this system processes various types of images as the search subject, search accuracy is improved by adjusting the weight of each feature amount by the image type.

The graphic trademark is basically irrelevant to color but mainly the shape of the graphic trademark and a meaning of the shape are important. Accordingly, since the feature amount related to color is less important, the weight of the feature amount related to color is preferably set to be lower or no effect.

Different from the graphic trademark, the company logo and illustration include color information but do not have fine pattern information such as a photograph or a CG (Computer Graphics). Accordingly, the weight of the feature amount related to the pattern is preferably set to be lower, so that the search effect can be improved.

Since for a product picture and a portrait, the feature amounts of a color, a shape, and a pattern of the product and the person are important but a background is less important, the feature amount of a region representing the image is preferably considered more than the color, the pattern, and location information, so as to effectively improve the search accuracy.

For the painting and the graphic as works, all feature amounts over the entire painting and graphic are effective.

The search result informing part 12c displays a search result by the similar image searching part 11a as a research report at the client terminal 211 to inform the search result to the research client. In this case, the entire or a part of a text being informed may be registered as a template in the text example DB 14 beforehand. Moreover, the image data, which are searched, may be displayed with the text based on a predetermined classification. Alternatively, the image data, which are searched, may be displayed all together at a special screen.

As the search result, in the research report, regarding to an image recognized as a similar and illegally used image, the image itself is displayed and also, a URL of the image, an image file name, a URL of a Web site showing the image, a domain type of the Web site (jp, com, de, or a like), a Web site showing the image (layout image: an appearance and a location of the image in a page), a similarity degree (0 through 100%), an image size (dot, pixel, or a like), an image file capacity (KB), a search subject period (start date and end date to associate with the research cycle), an area tendency, a falsification tendency, a seriousness degree, and a like are displayed.

As the area tendency, a country name where the Web site belongs is determined by the domain type and a written language of the Web site, or contents described by a site administrator, and then, the research report shows a country having a greater degree of illegally using the research subject image. The country may be plotted on a world map to display. In addition, it is possible to report a tendency of the domain type to show that the research subject image is often illegally used more in organizations (co.jp) or educational institutions (ac.jp) in the same country (Japan).

A person trying the illegal use may falsify an original (research subject) image to be a different image. It can be a purpose to misidentify as the original image. Thus, the person may falsify a part of various feature amounts of the images. For example, in a case of changing only color of a logo or a background of the logo, other features such as a shape, a pattern, or a like are quite similar to the original image but only the feature amount of color is quite different from the original image. As described above, the falsification tendency reports a tendency of a specific feature of the features (color, shape, pattern, or the like) which is most falsified.

As described above, similar to the falsification tendency, in a case in that most features are quite similar to the original data but the similarity degrees of one or a few features of the image are lower, the image is determined as a falsified image. The lower the similarity degrees of one or the few features of the image, the greater the falsification degree. That is, it is considered that the greater the falsification degree, the higher the seriousness degree.

In a case in that an image identical or similar to the research subject image (and unauthorized as a service user) is displayed on a top page of a Web site, it is considered that this case intentionally aims that a third person misidentifies as a Web site managed by the service user. On the other hand, in a case in that the image identical or similar to the research subject image is displayed at a link page linking to a related company or dealer company, it is considered that this case does not intentionally aim that the third person misidentifies as the Web site managed by the service user. Thus, it is possible to estimate the seriousness degree based on the page type. In this system, it is possible to determine and report the page layer, the page type, the location in the page (if displayed in a header, it highly aims for the third person to be misidentified) displaying the image in the Web site by a Web site analyzing method.

Identification information of the Web site includes the domain name/URL, the domain type, and the above-described Web site analyzing method. As the domain name/URL, the domain name or the URL of the Web site excluding an organization and a related organization of the research client from the research subject can be registered as a list. The domain type can limit a research subject country by the domain type such as jp=Japan, ge=Germany, cn=China, or a like. Moreover, the Web site analyzing method can specify a page layer by clearly determining a layer structure by a Web site transition analysis being based on hyperlink information such as a html tag.

The similar image searching part 11a can set the similarity degree based on the feature amount of the image data obtained as the similar image. The search result informing part 12c may sort the image data in an order of higher similarity degree set by the similar image searching part 11a, and display the image data being sorted with information including at least the identification information (such as the URL) of the Web site including the image data and the similarity degree of the image data, when the search result is display to inform the research client at the client terminal 211. In addition, the search result informing part 12c may individually display the image data having higher similarity degree with detail information based on the similarity degree, individually display the image data having a middle level of the similarity degree without the detail information, and display only image data having lower similarity degree at the same screen, as a display (informing) method.

The similarity degree shows a distance of the feature amounts (that is, distance between the research subject image and the test research subject) by a percentage in a case of using each feature amount as a single measurement. The similarity degree shows a distance of a weighted average of each feature amount by a percentage in a case of using a plurality of the feature amounts (in this embodiment, such as the color, the edge, the pattern, and the shape). This calculation is described as follows:

$$\text{similarity degree } d = K(\text{color}) \times d(\text{color}) + K(\text{edge}) \times d(\text{edge}) + K(\text{pattern}) \times d(\text{pattern}) + K(\text{shape}) \times d(\text{shape}) \quad (1)$$

In this calculation (1), K denotes a weight coefficient for each feature amount, and d denotes a value calculated as a distance between the research subject image and the test research subject image for each feature amount.

A user may determine that 100% of the similarity degree shows quite similar to the original image and 0% of the similarity degree shows not similar to the original image. However, in this system, this calculation result is determined as a difference degree. Accordingly, the difference degree 0% corresponds to the similarity degree 100%, and there is no distance between the research subject image and the test research subject image, that is, the difference degree 0% is determined as quite similar to the original image. The difference degree 100% corresponds to the similarity degree 0%, and there is a quite far distance between the research subject image and the test research subject image, that is, the difference degree 100% is determined as not similar to the original image.

The similarity image searching part 11a calculates the feature amount and the distance of the research subject image with respect to each feature amount of the test research subject. This calculation is conducted for all test research subject images. By using the above calculation (1), the similarity degree is calculated for each test research subject image. In addition, the similarity degree is picked up when the similarity degree as a result of the calculation is within the range being set beforehand.

The threshold for the similarity degree can be set corresponding to a purpose. For example, in a case in that the purpose is to send a warning e-mail to the Web site illegally using the research subject image, that is, the purpose is to send the warning e-mail showing the illegal use at the Web site based on search (research) subject list, the threshold is set to be higher so as to determine an image as a subject having the similarity degree being higher than a certain degree, and the warning e-mail is sent after the user confirms that the Web site definitely uses the research subject image illegally. In addition, the falsification tendency and the seriousness degree, which are shown in the research report, can be included to determine the illegal use.

In a case in that the purpose is to warn the Web site possible to illegally use the research subject image, that is, the purpose is to send an e-mail to the Web site, which displays the image similar to the research subject image and is not the search subject, in order to call attention to a possibility of using the research subject image without a permission, the threshold is set to be the middle level, and an image having the similarity degree being higher than a certain degree is a subject. If the user of this system intends to send an attention e-mail without a confirmation step of a user side, the confirmation step is omitted and the attention e-mail is sent to the Web site. When the above purpose is to indicate a proper use method, that is, the purpose is to send e-mail confirming whether or not the image is used properly, to a group organization with the permission to use the research subject image, a Web page describing a use regulation of an organization logo or a like is prepared beforehand, and a URL of the Web page is send by e-mail so as to confirm the proper use periodically.

The text example DB 14 records each text example of the warning e-mail including different contents corresponding to the similarity degree being set for each image data. In this case, the test example for the warning e-mail may be recorded in each language so as to correspond to a Web site in each country.

The search result informing part 12c includes a part for sending the warning e-mail to the Web site including the similar image searched by the similar image searching part 11a. When the search result informing part 12c sends the warning e-mail to the Web site 311 including the similar image, the search result informing part 12c may select the text example corresponding to the similarity degree of the similar image from the text example DB 14, set the selected text example to the warning e-mail, and send the warning e-mail including the selected text example from the text example DB 14 to an e-mail address shown in the Web site 311. Alternatively, the search result informing part 12c may send the warning e-mail including the selected text example to the client terminal 211 before sending the warning e-mail to the e-mail address shown in the Web site 311, and send the warning e-mail to the e-mail address shown in the Web site 311 after the research client confirms or modifies the warning e-mail.

Figure 5:
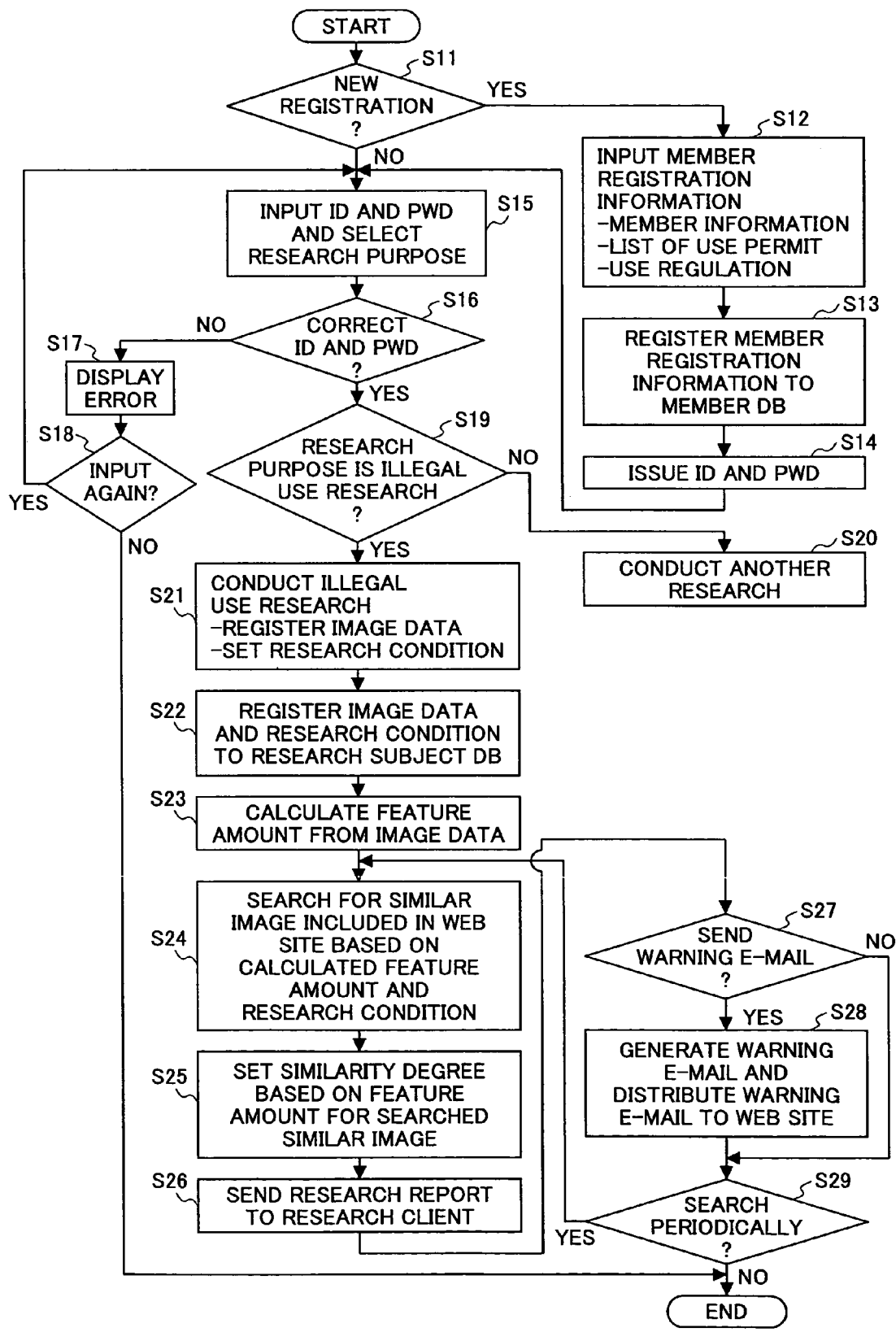
FIG. 5 is a flowchart for explaining an example of an illegal use research service providing method for the image data according to the first embodiment of the present invention.

FIG. 5 is a flowchart for explaining an example of an illegal use research service providing method for the image data according to the first embodiment of the present invention. In FIG. 5, the illegal use research service providing method will be described based on the illegal use research service providing system shown in FIG. 2. The management server 12 determines whether or not the research client is newly registered when the management server 12 receives a research request from the client terminal 211 through the network 22 (step S11). When the research client is newly registered (YES), the management server 12 receives member registration information (for example, member information, a user permit list, a use regulation, or a like) (step S12), registers the member registration information to the member DB 13 (step S13), issues a user ID and a PWD (password) after this registration ends (step S14), and advances to step S15.

On the other hand, when the research client is not newly registered in step S11, that is, the research client has been already registered (NO), the management server 12 selects an input of the user ID and the PWD and a research purpose (step S15). In this case, the management server 12 checks whether or not the user ID and the PWD input by the research client (step S16). When the user ID and the PWD are not correct (NO), the management server 12 displays an error at the client terminal 211 (step S17), and determines whether or not the user ID and the password are input again by the research client (step S18). When the user ID and the password are input again (YES), the management server 12 goes back to the step S15 to repeat the above steps. On the other hand, when the user ID and the password are input again (NO), the management server 12 terminates the illegal use research service providing method.

Next, when the user ID and the PWD are authenticated (step S16), the research client determines whether or not the research purpose is the illegal use research (step S19) When the research client indicates a research other than the illegal use research (for example, a similar design research or a like) (NO), the research is conducted (step S20). In the step S19, when the research purpose is the illegal use research (YES), the illegal use research concerning the image data is conducted (step S21). The management server 12 registers the image data 15a and the research condition 15c for the research subject to the research subject DB 15 (step S22). The search server 11 calculates the feature amount 15d from the image data 51a registered in the research subject DB 15 (step S23), and searches for the similar image included in the Web site group 30 based on the feature amount 15d being calculated and the research condition 15c (step S24).

Next, the search server 11 sets the similarity degree based on the feature amount with respect to the similar image searched in the step S24 (step S25), and the management server 12 sends the research report including at least the similar image and image information including the similarity degree of the similar image to the research client (client terminal 211) (step S26). Next, the management server 12 determines (based on the user selection) whether or not to send the warning e-mail to the Web site displaying the similar image (step S27). When the warning e-mail is sent to the Web site (YES), the management server 12 generates the warning e-mail corresponding to the similarity degree, and distributes the warning e-mail to the Web site (step S28).

Next, the management server 12 determines whether or not to conduct the similar search periodically based on the research condition 15c of the research subject DB 15 (step S29) When the similar search is conducted periodically (YES), the illegal use service providing method advances to the step S24 and searches for the similar image from the Web site group 30 at predetermined intervals defined beforehand. On the other hand, in the step S29, when the similar search is not conducted periodically, for example, the similar search is temporarily conducted (NO), the illegal use research service providing method is terminated. In the step S27, when the warning e-mail is not sent to the Web site (NO), the illegal use research service providing method advances to the step S29.

Figure 6:
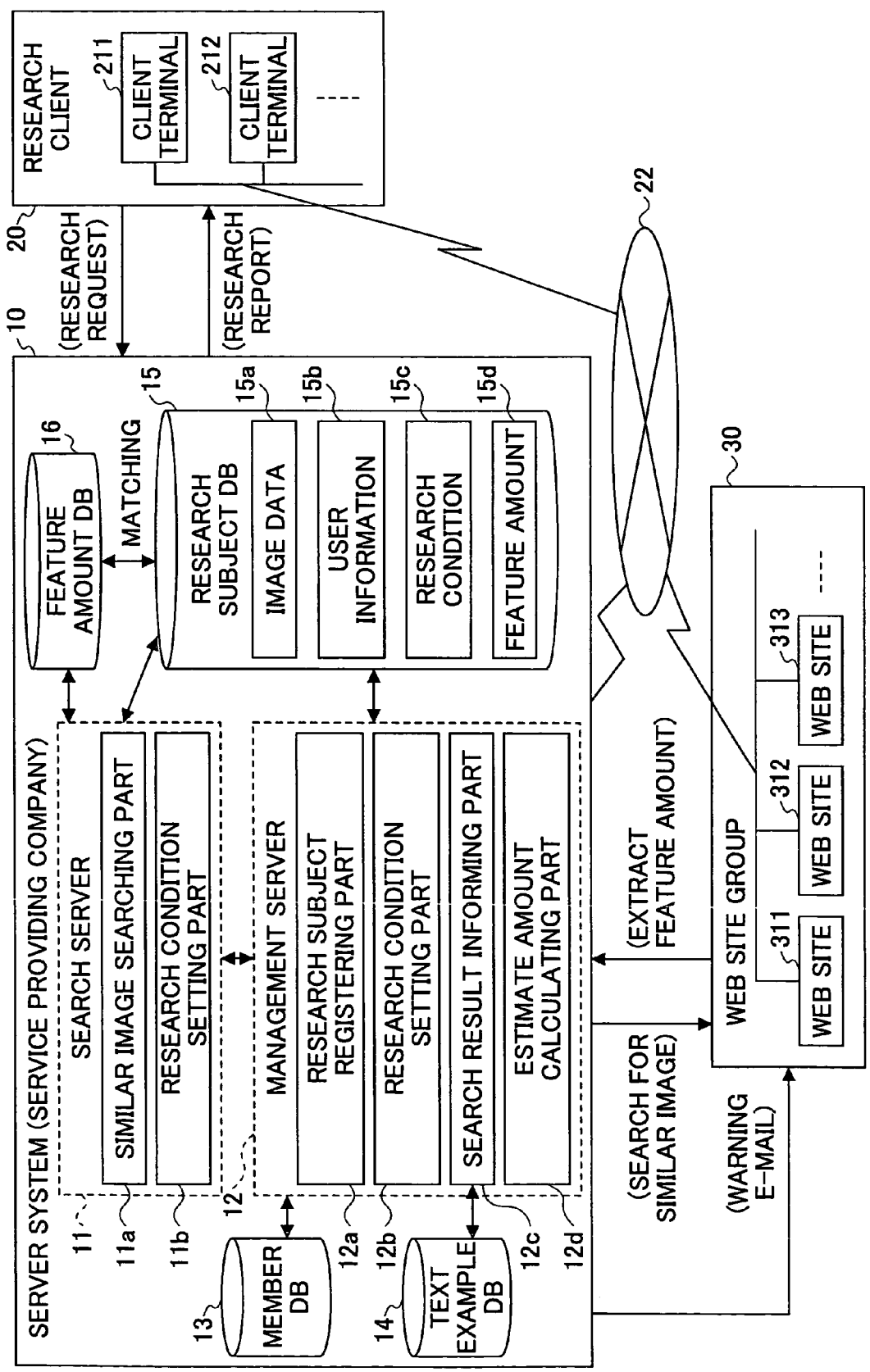
FIG. 6 is a diagram for explaining a configuration example of the illegal use research service providing system for the image data according to the first embodiment of the present invention.

FIG. 6 is a diagram for explaining a configuration example of the illegal use research service providing system for the image data according to the first embodiment of the present invention. The server system 10 includes the search server 11 and the management server 12, and includes the member DB 13, the text example DB 14, the research subject DB 15, and the feature amount DB 16. In addition, the search server 11 includes the similar image searching part 11a, and the feature amount registering part 11b, and can access the research subject DB 15 and the feature amount DB 16. The management server 12 includes the research subject registering part 12a, the research condition setting part 12b, the search result informing part 12c, and the estimate amount calculating part 12d, and can access the member DB 13, the text example DB 14, and the research subject DB 15. In this system configuration, different from the system configuration shown in FIG. 2, the illegal use research service providing system according to the first embodiment of the present invention includes the feature amount registering part 11b, the estimate amount calculating part 12d, and the feature amount DB 16. The other parts are the same as the parts in the system configuration shown in FIG. 2, and the explanation thereof will be omitted.

The feature amount registering part 11b of search server 11 calculates the feature amount from the image data including the Web site by searching for the Web site group 30 periodically on the network 22, and registers the calculated feature amount to the feature amount DB 16 by associating the calculated feature amount with the URL of each Web site. In the server system 10 according to the first embodiment of the present invention, a search of the similar image is conducted by comparing the feature amount 15d of the image data 15a registered in the research subject DB 15 with the feature amount registered in the feature amount DB 16. That is, the similar image searching part 11a sets a predetermined range to the feature amount 15d of the image data 15a registered in the research subject DB 15 and searches for the feature amount being within the predetermined range from the feature amount registered in the feature amount DB 16 when the similar image searching part 11a searches for the image data which is identical or similar to the image data 15a as the research subject image. As a result the similar image searching part 11a obtains the searched image data corresponding to the feature amount and the URL of the Web site including the searched image data.

The estimate amount calculating part 12d calculates an approximate estimate for an expense of the illegal use research based on the research condition 15c set by the research condition setting part 12b. The management server 12 may inform the estimate amount calculated by the estimate amount calculating part 12d before searching for the similar image by the similar image searching part 11a, and execute the similar image search when the research client approves the estimate amount. Alternatively, a budget range (upper limit of the expense) of the research client may be set, and the similar image search is conducted within this budget range.

A detailed embodiment of the estimate amount calculating part 12d will be described in the following:

(1) reduce the estimate amount each time the research condition 15c.

By setting the research condition 15c in detail, the research range is limited. Accordingly, since a workload to this system is reduced, the expense for the illegal use research service is reduced.

(2) charge corresponding to the number of the attention e-mails and the warning e-mails, or an automation degree.

It is possible to set to automatically distribute the attention text or the warning text prepared beforehand with respect to a mail address of an administrator or a contact person of the Web site, which is determined as the Web site illegally using the research subject image based on the research result. This system includes a function for automatically generating this attention text or this warning text and can provide a step for editing the text automatically generated. Alternatively, the attention or warning e-mail may not be set. The expense can be calculated by corresponding to these setting contents.

(3) no charge for the similar image search.

For example, the research (search) may be generally open to any research client by free, and a list of the test research subject images having higher similarity degree may be displayed as the research result. However, information such as the URL of the Web site including the image being searched cannot be displayed unless the research client tends to pay a service expense. Since the service user can apply to a charged service after a service user confirms that a preferable research result can be obtained, a satisfaction degree of the service user can be higher. In a case in that the research subject can be narrowed or a list registration of the domain name and the URL to exclude the research subject, a user registration is required and only charged service is required to apply. However, a condition setting can be free.

The research subject registering part 12*a* may register a research history concerning the image data for each research client with the image data subject to the illegal use research to the research subject DB 15. In this case, the research subject registering part 12*a* may register the number of sending the warning e-mail by the search result informing part 12*c* as the research history registered in the research subject DB 15 for each Web site including the similar image searched by the similar image searching part 11*a*. Moreover, the search result informing part 12*c* may change a warning content of the warning e-mail gradually (for example, an attention content until four times and the warning content after more than four times) by corresponding to the number of sending the warning e-mail registered by the research subject registering part 12*a*.

According to the first embodiment of the present invention, the similar image search can be realized by a simple system configuration. Therefore, it is possible to conduct the illegal use research effectively and at a lower expense. Moreover, since the similar image search can be realized for various image data, it is possible to apply the similar image search for a wider purpose. Furthermore, since it is possible to research the Web site possible to infringe a copy right based on the similar image, it is possible to trace and research the Web site even if a site administrator infringing the copy right with malicious intent closes the Web site and open the Web site by another URL.

Figure 7:
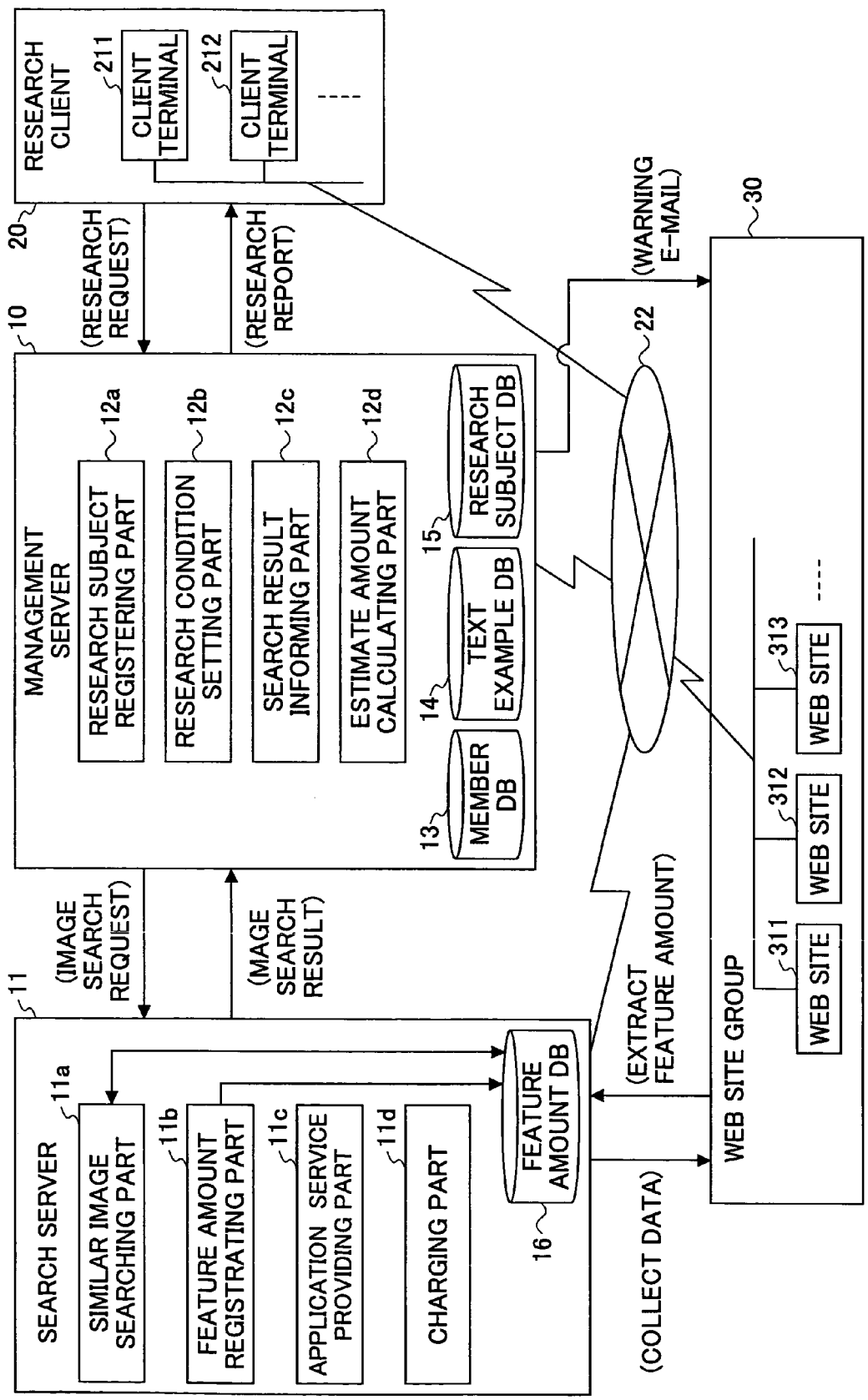
FIG. 7 is a diagram for explaining a further system configuration example of the illegal use research service providing system for the image data according to the first embodiment of the present invention.

FIG. 7 is a diagram for explaining a further system configuration example of the illegal use research service providing system for the image data according to the first embodiment of the present invention. In FIG. 7, the illegal use research service providing system includes the search server 11 and the management server 12 but different organizations independently manage and operate the search server 11 and the management server 12, respectively. The search server 11 includes the similar image searching part 11*a*, the feature amount registering part 11*b*, an application service providing part 11*c*, and a charging part 11*d*, and can access the feature amount DB 16 and/or the research subject DB 15. The management server 12 includes the research subject registering part 12*a*, the research condition setting part 12*b*, the search result informing part 12*c* and the estimate amount calculating part 12*d*, and can access the member DB 13, the text example DB 14, and the research subject DB 15.

As shown in FIG. 7, in the present invention, the image searching function included in the search server 11 can be applied to an ASP (Application Service Provider) system in which the image searching function can be provided through the network as an application. In this case, the application service providing part 11*c* of the search server 11 included in an ASP service provider provides various services as applications through the network to provide various parts (the similar image searching part 11*a* and/or the feature amount registering part 11*b*) included in the search server 11, to the management server 12 as a service receiver. Moreover, the charging part 11*d* charges for a service provided by the application service providing part 11*c*. A charging method by the charging part 11*d* may determine a charged amount by corresponding to the research condition (or the research result) such as a frequency of the similar search, the search range, the number of sets of image data as the search subject, the number of search hits, or the like. Alternatively, the charging method may determine the charged amount based on a fixed rate by a predetermined unit such as monthly, daily, a search unit, or a like.

Figure 8:
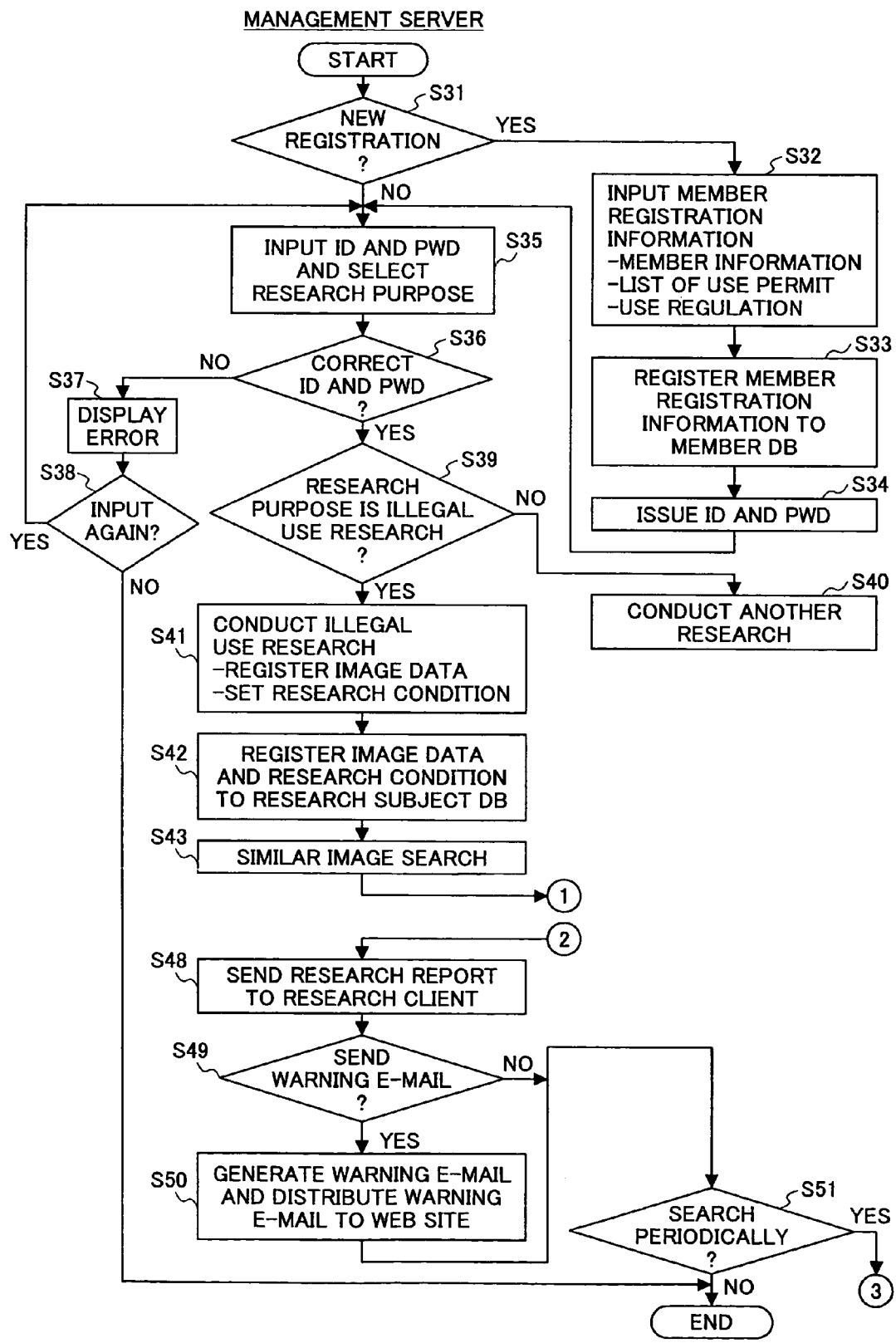
FIG. 8 is a diagram showing a process flow at the search server according to the first embodiment of the present invention.
Figure 9:
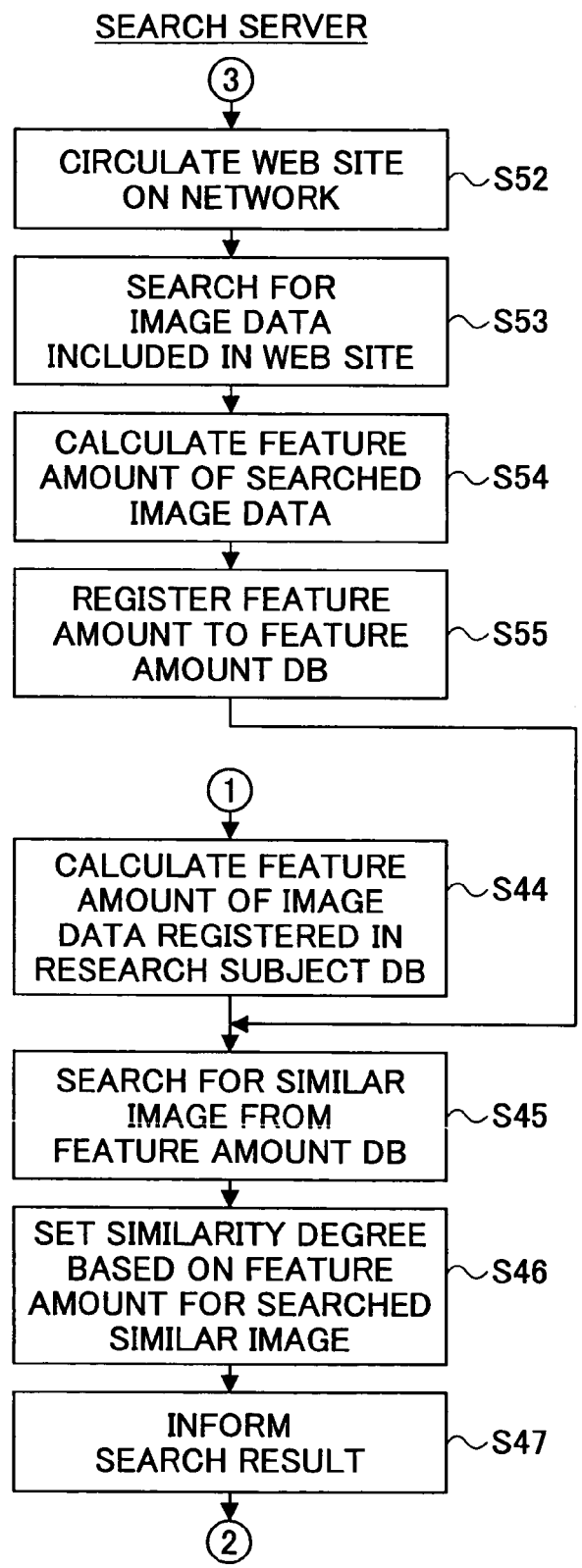
FIG. 9 is a diagram showing a process flow at the search server according to the first embodiment of the present invention.

FIG. 8 and FIG. 9 are flowcharts for explaining another illegal use research service providing method for the image data according to the first embodiment of the present invention. FIG. 8 is a diagram showing a process flow at the search server according to the first embodiment of the present invention. FIG. 9 is a diagram showing a process flow at the search server according to the first embodiment of the present invention. This illegal use research service providing method will be described based on the illegal use research service providing system in FIG. 6.

In FIG. 8, first, the management server 12 determines whether or not the research client is newly registered when accepting the research request from the client terminal 211 through the network 22 (step S31). When the research client is newly registered (YES), the management server 12 receives the member registration information (for example, the member information, the user permit list, the user regulation, and the like) input by the research client (step S32), and registers the member registration information to the member DB 13 (step S35). After this registration ends, the management server 12 issues the user ID and PWD (password) (step S34), and advances to step S35.

In the step S31, when the research client is not newly registered, that is, the research client has been already registered (NO), the management server 12 selects an input of the user ID and PWD or the research purpose (step S35). In this case, the management server 12 checks whether or not the user ID and PWD input by the research client is correct (step S36). When the user ID and PWD are not correct (NO), the management server 12 displays an error at the client terminal 211 (step S37), and checks whether or not the user ID and PWD are input again (by the research client) (step S38). When the user ID and PWD are input again (YES), the management server 12 goes back to the step S35 to repeat the above-described steps. On the other hand, when the user ID and PWD are not input again (NO), the illegal use research service providing method is terminated.

Next, when the user ID and PWD are authenticated in the step S36, it is checked (by the research client) whether or not the research purpose is the illegal use research (step S39). When the research purpose is a research (for example, the similar design research or the like) other than the illegal research (NO), the research is conducted (step S40). In the step S39, when the research purpose is the illegal use research (YES), the illegal use research concerning the image data is conducted (step S40). The management server 12 registers the image data 15*a* as the research subject image and the research condition 15*c* to the research subject DB 15 (step S42), and requests the similar image search to the search server 11 (step S43). In this case, the management server 12 may request with the image data 15*a* being the research subject image to the search server 11.

In FIG. 9, the search server 11 calculates the feature amount 15*d* from the image data 15*a* registered in the research subject DB 15 (step S44), and searches for the similar image by matching with the feature amount registered in the feature amount DB 16 based on the feature amount 15*d* being calculated and the research condition 15*c* (step S45). Next, the search server 11 sets the similarity degree based on the feature amount with respect to the similar image being searched (step S46), and informs the search result including at least the similar image and image information including the similarity degree of the similarity image to the management server 12 (step S47).

In FIG. 8, the management server 12 sends the research report based on the search result informed from the search server 11 to the research client (client terminal 211) step S48). Next, the management server 12 determines whether or not to send the warning e-mail to the Web site displaying the similar image (step S49). When the warning e-mail is sent to the Web site (YES), the management server 12 generates the warning e-mail corresponding to the similarity degree, and distributes the warning e-mail to the Web site (step S50)

Next, the management server 12 determines whether or not the similar search is conducted periodically, based on the research condition 15*c* registered in the research subject DB 15 (step S51). When the similar search is conducted periodically (YES), the management server advances to step S52.

In FIG. 9, the search server 11 circulates the Web sites included in the Web site group 30 on the network 22 (step S52), searches for the image data from each Web site being circulated (step S53), calculates the feature amount of the image data being searched for (step S54), and registers the feature amount being calculated to the feature amount DB 16 (step S55). The feature amount DB 16 is referred to by the search server 11 in the step S 45.

In the step S52 in FIG. 8, when the similar search is not conducted periodically, for example, the similar search is temporarily conducted (NO), the illegal use research service providing method is terminated. In the step S49, when the warning e-mail is not sent to the Web site (NO) the illegal use research service providing method advances to the step S51.

Next, data tables registered by the server system 10 will be described. FIG. 10A is a diagram showing an example of a client information management table registering information, which is the research subject, concerning the research client according to the first embodiment of the present invention. FIG. 10B is a diagram showing an example of a trademark information management table registering information concerning a trademark according to the first embodiment of the present invention. In FIG. 10A, in the client information management table, for example, items such as a research client name (user organization name), a registered date, trademark information (shown by an identification number), agreement information (shown by an identification number), valid term, image information. (shown by an identification number), an URL, report information, previous research date, and a like are registered. In FIG. 10B, in the trademark information management table, for example, items such as a trademark, a pronunciation, a category, an image size, a letter type, color, a pattern, a data type, an attachment (for example, a HP, a catalog, a manual, or a like), and a like are registered.

FIG. 11A is a diagram showing an example of an agreement information management table for registering information concerning an agreement, according to the first embodiment of the present invention. FIG. 11B is a diagram showing an example of a form management table for registering information concerning contents (message) of the warning e-mail, according to the first embodiment of the present invention. FIG. 11C is a diagram showing an example of a similarity degree management table for registering information concerning the similarity degree being set to the image data, according to the first embodiment of the present invention.

In FIG. 11A, the agreement information management table, for each company name contracting the use agreement of the trademark (that is., company name that received the user permit of the trademark), for example, items of a registered date, trademark information, agreement information, valid term, a URL, and a like are registered. Moreover, in FIG. 11B, for example, in the form management table, a form name (for example, a warning form, an advisory form, or a like), a registered date, a form type (template) (shown by an identification number), a similarity degree of the image data (A, B, . . . ), a valid term, and a like are registered. Furthermore, in FIG. 1C, in the similarity degree management table, for each similarity degree of the image data, for example, a form type (template) (shown by an identification number), a valid term, a display method (for example, a detail display, a simple display, or a like) and a like are registered.

FIG. 12 is a diagram showing an example of a service login screen in the illegal use research service providing system according to the first embodiment of the present invention. In FIG. 12, the service login screen 40 includes a member registration page link 41, a member ID and password input area 42, a research purpose selection area 43, and a research detail setting page link 44. In a case of a new member registration, the research client using this service accesses a member registration page from the member registration page link 41 to conduct the member registration. In a case in that the research client is a member, the research client inputs his/her member ID and password to the member ID and password input area 42. Subsequently, the research client selects a desired course from the research purpose selection area 43 (such as illegal use research, a proper use research, a design research, or a like), and then goes to a research detail setting page by clicking the research detail setting page link 44 to set a detail research condition.

FIG. 13 is a diagram showing an example of a research condition setting screen in the illegal use research service providing system according to the first embodiment of the present invention. In FIG. 13, the research condition setting screen 50 includes a registration setting 51 of the research subject image, a registration setting 52 of a research period (report cycle), a type registration setting 53 of the research subject image, a registration setting 54 of a file attribute, a registration setting 55 of a site attribute, and a search start button 56. The research client can select the image data to be research subject by clicking "REFER" button of the registration setting 51 of the research subject image. In this example, image data 51*a* and 51*a* are selected image data. Furthermore, in a case in that the image data 51*a* and 51*b* are set to be search subject, each check box is checked. Only image data where the check box is checked become the research subject. When two images (image data 51*a* and 51*b*) are checked, "or" search is conducted.

Next, in the registration setting 52 of the search period (report cycle), it is possible to indicate to search retrospectively (trace back search). In this trace back search is indicated, a period of displaying the image data 51*a* and 51*b* is required to indicate. Moreover, for example, the report cycle/number can be indicated so as to be "daily x once". The management server 12 distributes the research report periodically in accordance with this indicated schedule.

Next, in the type registration setting 53 of the research subject image, a type of the image data requested to search (for example, a photograph, a company mark, a trademark, a logo, or a like) can be indicated. Moreover, it is possible to indicate a different color of a main element or indicate to ignore or a like.

Next, in the registration setting 54 of the file attribute, the format of the image data requested to search (for example, JPEG, GIF, PNG, or a like) can be indicated. Moreover, a capacity range of the image data requested to search (for example, 100 KB to 1000 KB, or a like) can be indicated.

Furthermore, a size range of the image data requested to search (for example, length 100 dots × width 100 dots or a like) can be indicated.

The registration setting 55 of the site attribute is an item to check when the research subject is limited. For example, it is possible to select a method for liming the research subject from a domain type of the URL such as co.jp, ne.jp, or a like, a method for limiting the research subject from a general page type such as a top page of an HP (Home Page) a method for limiting the research subject for each page layer from a domain, or a like.

The research client clicks the search start button 56 at the research condition setting screen 50 after setting the above-described items. When the search start button 56 is clicked, a searching process for searching for the similar image is started by the server system FIG. 14 is a diagram showing an example of a search result displaying screen in the illegal use research service providing system according to the first embodiment of the present invention. In FIG. 14, the search result displaying screen 60 includes an original (search subject) 61, search results 62, 63, and 64. Each of the search results 62, 63, and 64 includes image data searched as the similar image, image information concerning image data, a site displaying the image data, and a link button for linking a text creating screen for creating a text of the warning/attention e-mail. The image information, for example, includes an URL, a file name, a similarity degree, an image size, a file capacity, and a like. These search results are sorted by the similarity degree. When the research client wants to send the warning/attention e-mail to a Web site based on the search result 64, the research client clicks a link 64a to go to the text creating screen for the warning/attention e-mail.

As described above, the research client can easily specify the similar image and the Web site displaying the similar image. Therefore, it is possible to effectively make a plan against an unauthorized use of the trademark or a like and bring the plan into practice at a proper timing.

A warning/attention e-mail creating form screen in the illegal use research service providing system will be described with reference to FIG. 15A and FIG. 15B. FIG. 15A is a diagram showing a state of setting a text example in a warning/attention e-mail creating form according to the first embodiment of the present invention. FIG. 15B is a diagram showing a state of additionally modifying the text example of the warning/attention e-mail creating form according to the first embodiment of the present invention. In FIG. 15A and FIG. 15B, the warning/attention e-mail creating form screen 70 includes a "CONFIRM" button 71, a "BACK TO MODIFY" button 72, and a "SEND" button 73. In FIG. 15A and FIG. 15B, the warning/attention e-mail creating form screen 70 includes items of "TEXT (PURPOSE) TYPE", "RECEIVER ADDRESS", "SENDER ADDRESS (TO REPLY)", "E-MAIL TITLE", "WARNING/ATTENTION TEXT", and a like.

In the item "TEXT (PURPOSE) TYPE", a text registered beforehand in the text example DB 14 can be selected and the contents (message) are displayed at the item "WARNING/ATTENTION TEXT". In the item "RECEIVER ADDRESS", one e-mail address can be selected from a list of e-mail addresses indicated in the Web site. In the item "SENDER ADDRESS (TO REPLY)", an e-mail address obtained from the member information registered in the member DB 13 is set (and can be changed). The items "E-MAIL TITLE" and "WARNING/ATTENTION TEXT" can be approximately changed by the research client. FIG. 15B shows a state in that the items "E-MAIL TITLE" and "WARNING/ATTENTION TEXT" are changed.

FIG. 16 is a diagram showing another example of the search result displaying screen in the illegal use research service providing system according to the first embodiment of the present invention. In FIG. 16, the search result displaying screen 80 includes an original (search subject) 81, search results 82, 83, and 84. Each of the search results 82, 83, and 84 includes image data searched as the similar image, image information concerning the image data, and a site displaying the image data. The search result displaying screen 80 is an example of a screen showing the search results from searching for a Web page that is not listed in the use permit list. In a case of the image data of the search result 82, the image data are displayed at a customer site. The color of this logo is not complied to the use policy and the background of this logo is roughly cut out. In a case of the image data of the search result 83, the image data are displayed at a site that is nothing to relate to a business of the research client, and the background of the logo is not uniformed. In a case of the image of the search result 84, the image data is displayed at a dealer site handling products of the research client, but the image data is not permitted to use for the dealer site. As described above, it is possible to easily confirm various states of displaying the image data at various Web sites, including the user permit and the unauthorized use. Therefore, it is possible to effectively make a plan for a use of the trademark or a like and bring the plan into practice at a proper timing.

The illegal use research service providing system according to the first embodiment of the present invention is not limited to image data concerning the trademark and can be applied to various image data. In the following, an application example of another an image search service will be described.

FIG. 17 is a diagram showing further example of the search result displaying screen in the illegal use research service providing system according to the first embodiment of the present invention. In FIG. 17, the search result displaying screen 90 includes an original (search subject) 91, and search results 92, 93, and 94. Each of the search results 92, 93, and 94 includes image data searched as the similar image, image information concerning the image data, and a site displaying the image data. In this case, these search results show how a product of the research client (for example, a brand bag) is handled at Web sites. From these search results, for example, by confirming whether or not the Web site is a Web site being managed by an authorized agent, it is possible to research whether the product shown at the Web site is a stock from an authorized route or an imitation.

Moreover, it is possible to research whether or not a product image used at an auction site is an official product image used by a manufacturer of the product or a distributor of the product. Furthermore, in an organization having images as literary works made by a cameraman or an illustrator, it is possible to research whether or not the owned images are illegally used on a Web site.

In the first embodiment, each function realized in the illegal use research service providing system or apparatus for image data are described. The present invention can be realized by a method for conducting each steps in the illegal use research service providing system or apparatus. Moreover, similar to the illegal use research service providing system or apparatus including each function, the present invention can be realized by a program for causing a computer to function as the illegal use research service providing system or apparatus. Furthermore, the present invention can be realized by installing the program recorded in a computer-readable recording medium.

An embodiment of the computer-readable recording medium recording the program and data to realize the illegal use research service providing function for the image data will be described according to the present invention. As the computer-readable recording medium, in detail, a CD-ROM (-R/-RW), a magneto-optical disk, a DVD-ROM, a FD (floppy disk), a flash memory, a memory card, a memory stick, and other various ROMs and RAMs can be used. It is possible to easily realize the illegal use research service providing function by recording and distributing the program causing a computer to function as each system according to the first embodiment of the present invention and realizing the illegal use research service providing function. Then, the program is installed from the computer-readable recording medium to a computer as an information processing apparatus, and read out the program by a CPU of the computer, so as to realize the illegal use research served providing function. Alternatively, the program is recorded to the computer-readable recording medium mounted to the information processing apparatus, and read out the program if necessary, so as to realize the illegal use research served providing function.

Second Embodiment

In a second embodiment, the present invention is applied to a proper use research service providing system or apparatus for researching whether or not image data being permitted to user are properly used at Web sites on a network. In the second embodiment, processes, system configurations, screens displayed at a client terminal of a research client are the same as those in the first embodiment and the explanations will be omitted. In the second embodiment, the illegal use research in the first embodiment is replaced with a proper use research. The similarity degree in the first embodiment is replaced with a proper degree. The warning e-mail or the attention e-mail in the fist embodiment is replaced with the communication e-mail. Accordingly, only different portions from the first embodiment will be described in the following.

A server apparatus and a client terminal in the proper use research service providing system of the present invention are the same as those as shown in FIG. 1 in the first embodiment.

Figure 18:
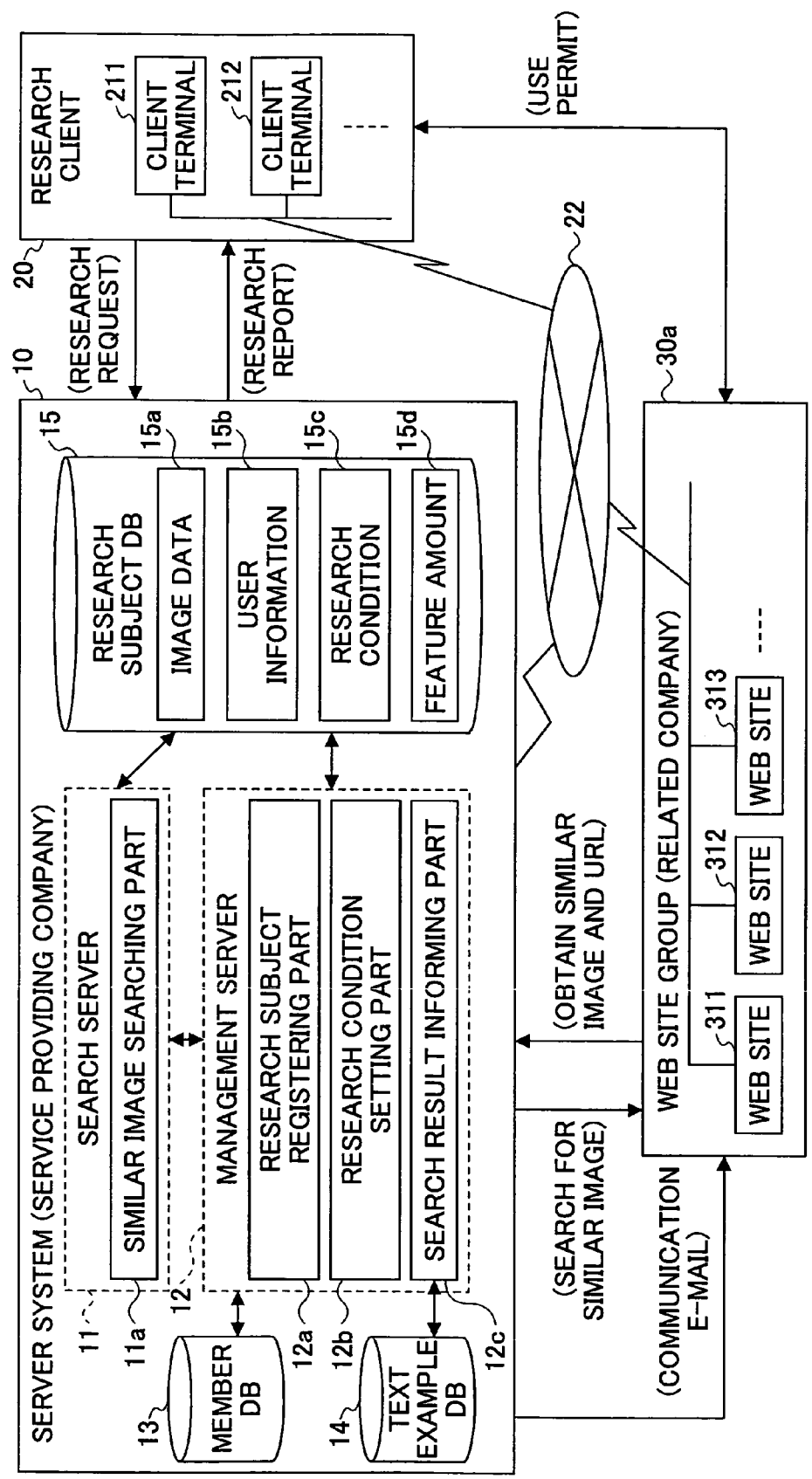
FIG. 18 is a diagram showing a configuration example of a proper use research service providing system for the image data according to a second embodiment of the present invention.

FIG. 18 is a diagram showing a configuration example of the proper use research service providing system for the image data according to the second embodiment of the present invention. In FIG. 18, parts that are the same as the ones in FIG. 2 in the first embodiment are indicated by the same reference numerals and the explanation thereof will be omitted. In FIG. 18, the server system 10 functions to provide the proper use research service in the second embodiment. The Web site group 30a is a group of Web sites 311, 312, 313, . . . (hereinafter, often called generally Web site 311), which are managed by related companies and agents which received the user permit from the research client, on the network 22. In this case, the Web site 311 received and has already had the use permit to use the image data 15a from the research client 20. The image data 15a is a subject of the proper use research.

In the proper use research service providing system, it is checked whether or not the related company or the like, which has an agreement of the user permit concerning the image data (trademark, naming, logo, or a like as the research subject) set by the research client of an organization, properly use the image data, and the check result can be informed to the research client. Therefore, the research client can uniformly manage a brand image, including the related company and the like.

Generally, the organization manages and monitors a trademark application, and a trademark and regulates allowable color, size, character type, background, and these combinations in the use agreement (use agreement information) in detail. A user permitted to use (for example, a related company, a distributor, a branch, an agent, or a like) complies this regulation and then display the trademark, the naming, the logo of the contract partner at a top page of a related home page, a product, an advertisement, or a like. This use regulation is defined in order to uniformly manage the brand image, including the related companies. Then, even the related company can conduct the same use management as a parent company. In this case, only a user of the related company or the like, which has the use agreement, can use the trademark or the like. In this system, the use agreement information is included in the user information 15B and registered to the research subject DB 15. Therefore, it is possible to determine whether or not the image data 15a is properly used in accordance with the user agreement.

The feature amount calculated by the feature amount calculating part is the same as that in the first embodiment of the present invention (FIG. 3), and the explanation thereof will be omitted.

The feature amount calculating process conducted by the feature amount calculating part is the same as that in the in the first embodiment of the present invention (FIG. 4), and the explanation thereof will be omitted.

In the second embodiment, the similar image searching part 11a can set the proper degree based on the feature amount of the image data obtained as the similar image. The search result informing part 12c may sort the image data in an order of higher proper degree set by the similar image searching part 11a, and display the image data being sorted with information including at least the identification information (such as the URL) of the Web site including the image data, the proper degree of the image data, and comment information of the image data, when the search result is display to inform the research client at the client terminal 211. In addition, the search result informing part 12c may individually display the image data having higher proper degree with detail information based on the proper degree, individually display the image data having a middle level of the proper degree without the detail information, and display only image data having lower proper degree at the same screen, as a display (informing) method.

The proper degree shows a distance of the feature amounts (that is, distance between the research subject image and the test research subject) by a percentage in a case of using each feature amount as a single measurement. The proper degree shows a distance of a weighted average of each feature amount by a percentage in a case of using a plurality of the feature amounts (in this embodiment, such as the color, the edge, the pattern, and the shape). This calculation is described as follows:

$$\text{proper degree } d = K(\text{color}) \times d(\text{color}) \times K(\text{edge}) \times d(\text{edge}) + \quad (2)$$
$$K(\text{pattern}) \times d(\text{pattern}) + K(\text{shape}) \times d(\text{shape})$$

In this calculation (2), K denotes a weight coefficient for each feature amount, and d denotes a value calculated as a distance between the research subject image and the test research subject image for each feature amount.

A user may determine that 100% of the proper degree shows quite similar to the original image and 0% of the proper degree shows not similar to the original image. However, in this system, this calculation result is determined as a difference degree. Accordingly, the difference degree 0% corresponds to the proper degree 100%, and there is no distance between the research subject image and the test research subject image, that is, the difference degree 0% is determined as quite similar to the original image. The difference degree 100% corresponds to the proper degree 0%, and there is a quite far distance between the research subject image and the test research subject image, that is, the difference degree 100% is determined as not similar to the original image.

Figure 19:
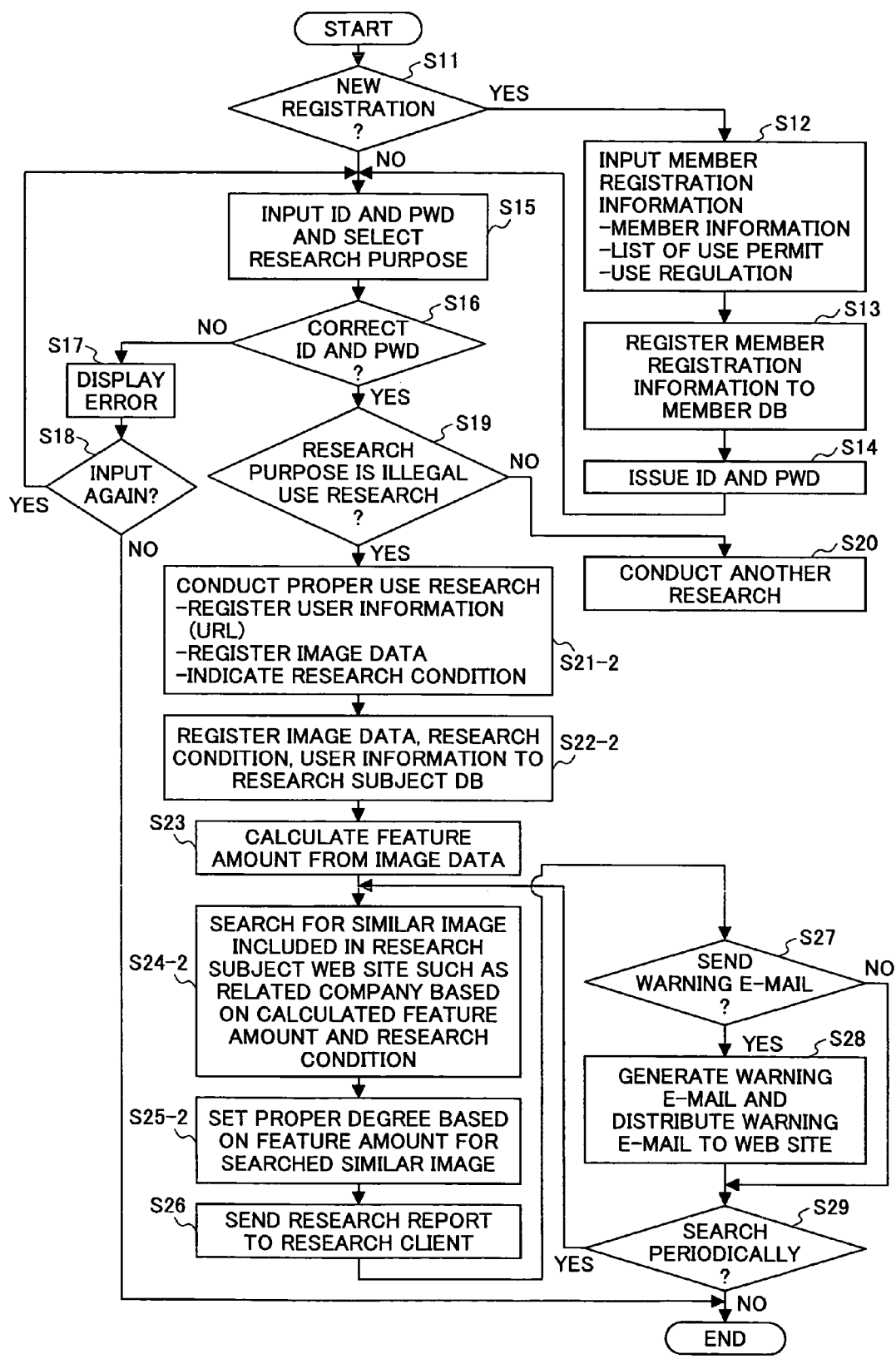
FIG. 19 is a flowchart for explaining an example of the proper use research service providing method for the image data according to the second embodiment of the present invention.

FIG. 19 is a flowchart for explaining an example of the proper use research service providing method for the image data according to the second embodiment of the present invention. This proper use research service providing method will be described based on the proper use research service providing system shown in FIG. 18. In FIG. 19, steps that are the same as the ones in FIG. 5 in the first embodiment are indicated by the same reference numerals and the explanation thereof will be omitted.

In the step S19, the research purpose is the proper use research (YES), the proper use research concerning the image data is conducted (step S21-2). The management server 12 registers the image data 15a, the research condition 15c, and the user information 15b (step S22-2). The search server 11 calculates the feature amount 15d from the image data 15a being registered in the research subject DB 15 (step S23) and searches for the similar image included in the Web site group 30a such as the related company and the like based on the feature amount 15d and the research condition 15c (step S24-2).

Next, the search server 11 sets the proper degree based on the feature amount for the similar image searched in the step S24-2 (step S25-2). Then, the management server 12 sends the research report to the research client (client terminal 211), and the management server 12 generates and distributes the communication e-mail corresponding to the proper degree (steps S26 through S28). Other steps are conducted similarly to the first embodiment (FIG. 5).

Figure 20:
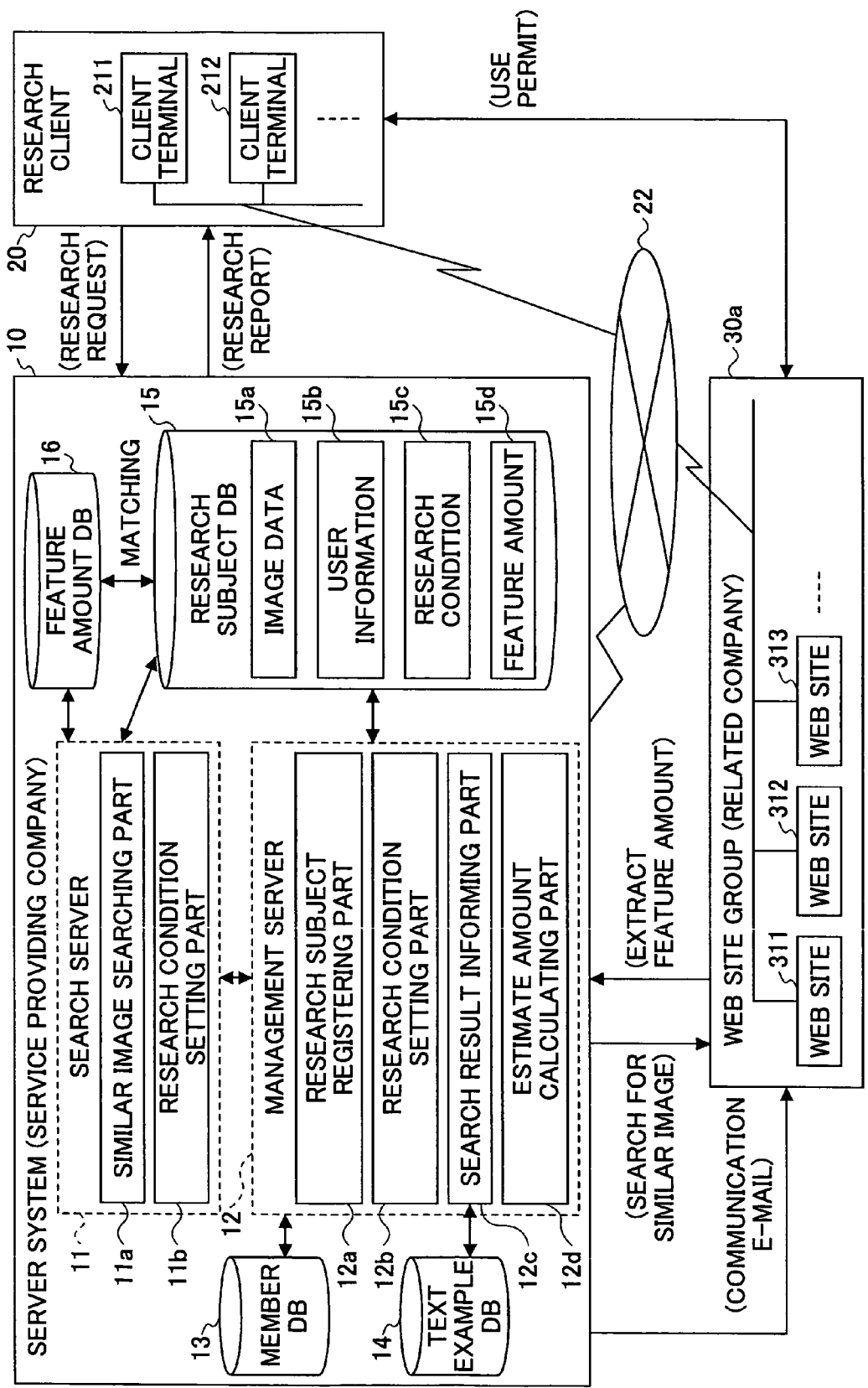
FIG. 20 is a diagram for explaining another configuration example of the proper use research service providing system for the image data according to the second embodiment of the present invention.

FIG. 20 is a diagram for explaining another configuration example of the proper use research service providing system for the image data according to the second embodiment of the present invention. In FIG. 20, parts that are the same as the ones in FIG. 6 in the first embodiment are indicated by the same reference numerals and the explanation thereof will be omitted. In this configuration, the Web site 311 has the use agreement with the research client 20.

Figure 21:
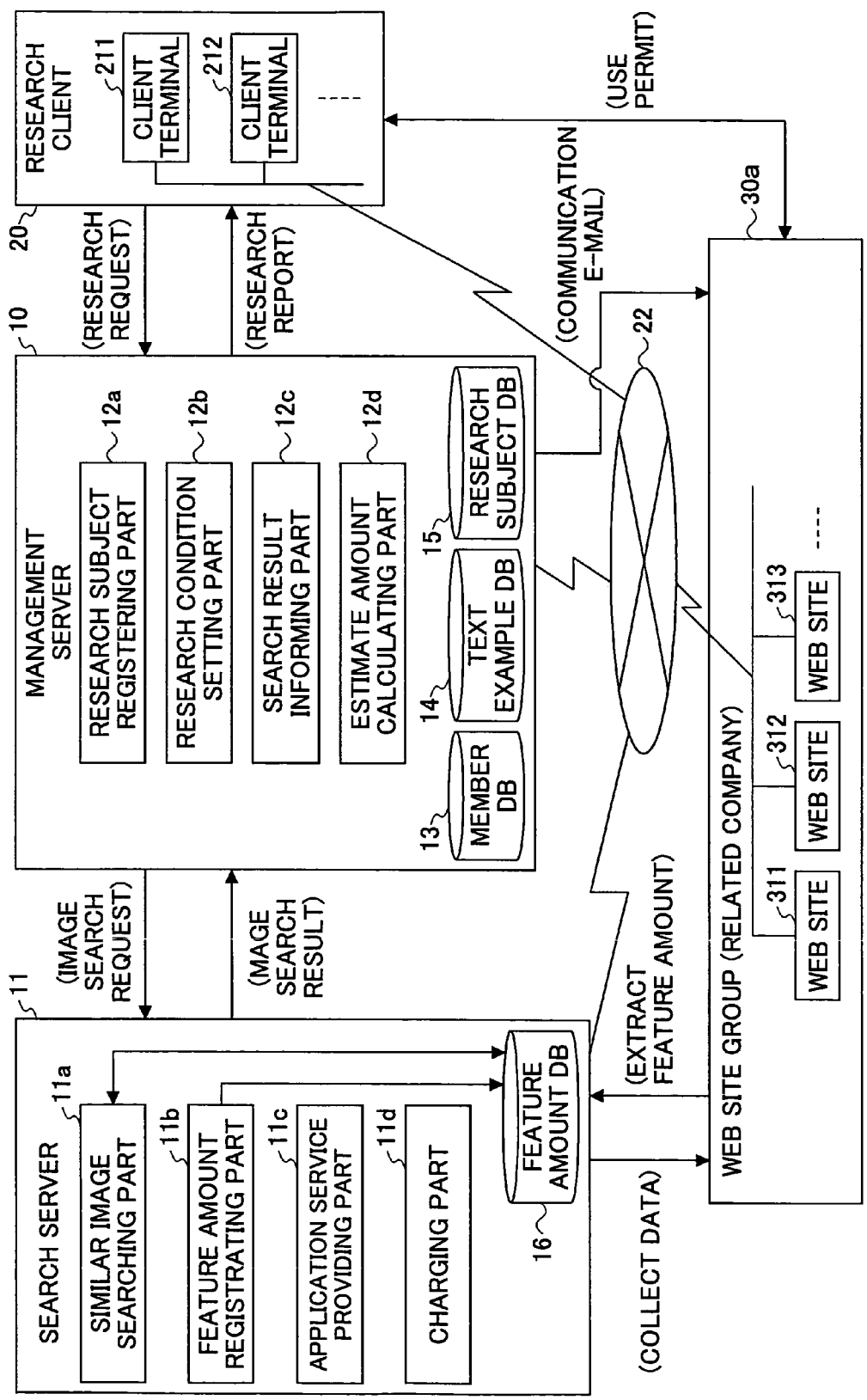
FIG. 21 is a diagram for explaining further configuration example of the proper use research service providing system for the image data according to the second embodiment of the present invention.

FIG. 21 is a diagram for explaining further configuration example of the proper use research service providing system for the image data according to the second embodiment of the present invention. In FIG. 21, parts that are the same as the ones in FIG. 7 in the first embodiment are indicated by the same reference numerals and the explanation thereof will be omitted. In this configuration, the Web site 311 has the use agreement with the research client 20.

Figure 22:
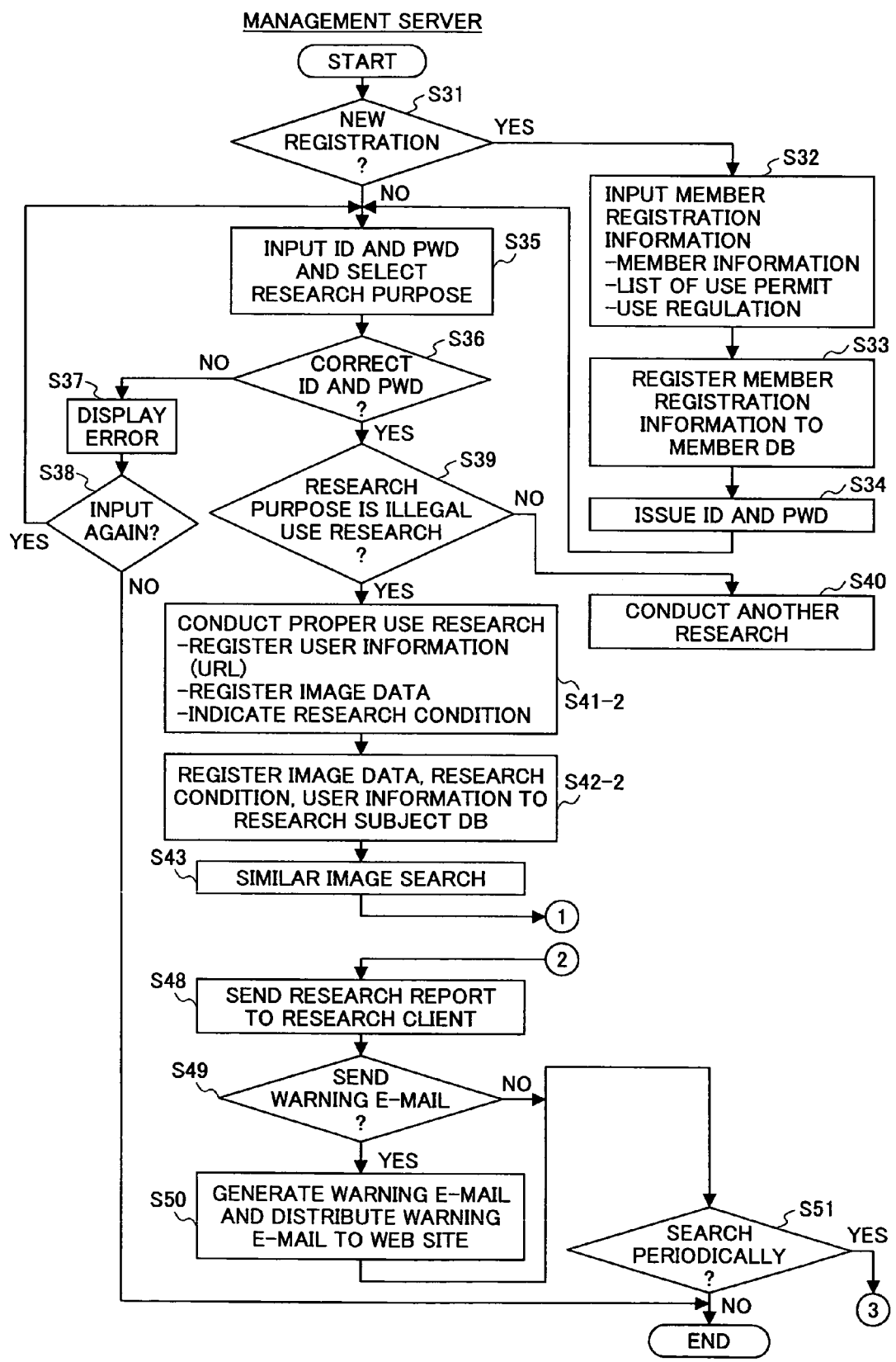
FIG. 22 is a diagram showing a process flow at the search server according to the second embodiment of the present invention.
Figure 23:
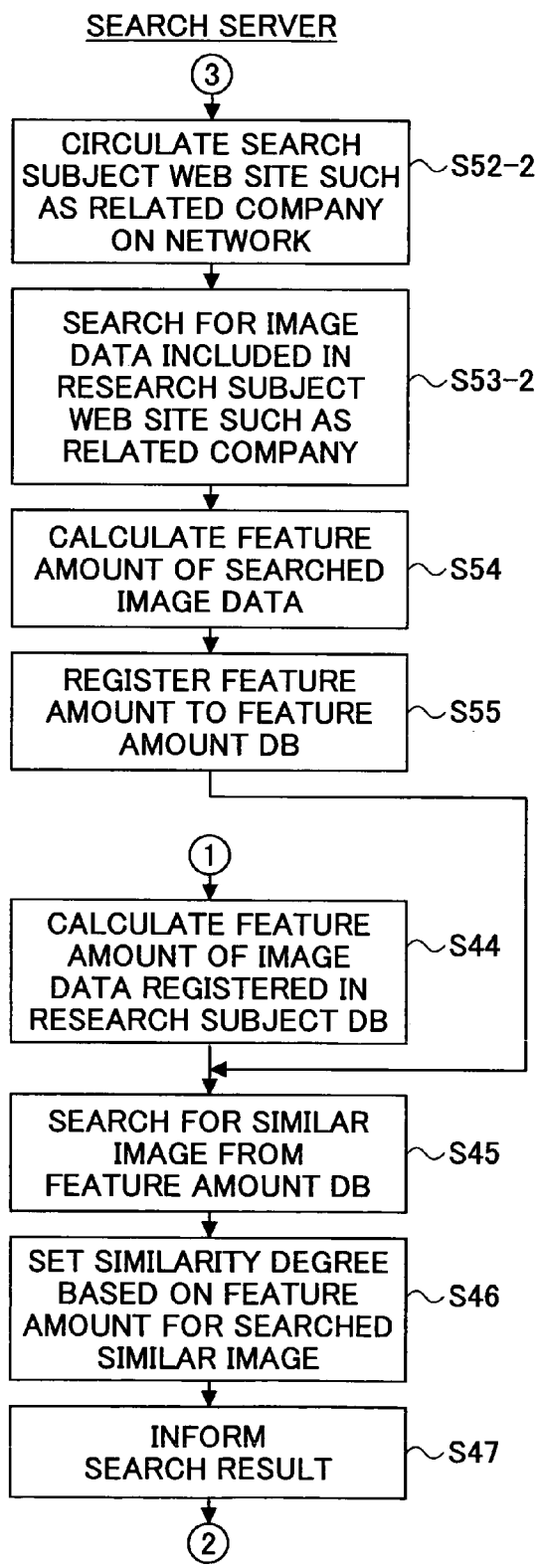
FIG. 23 is a diagram showing a process flow at the search server according to the second embodiment of the present invention.

FIG. 22 and FIG. 23 are flowcharts for explaining another proper use research service providing method for the image data according to the second embodiment of the present invention. FIG. 22 is a diagram showing a process flow at the search server according to the second embodiment of the present invention. FIG. 23 is a diagram showing a process flow at the search server according to the second embodiment of the present invention. This proper use research service providing method will be described based on the proper use research service providing system shown in FIG. 6 in the first embodiment.

Different from the first embodiment, in the step S39, when the research purpose is the proper use research (YES), the proper use research is conducted (step S41-2). The management server 12 registers the image data 15a being the research subject, the research condition 15c, and the user information 15b (a URL of the research subject Web Site, use agreement, and a like) to the research subject Db 15 (step S42-2). Then, the management server 12 request the similar image search to the search server 11 (step S43).

In the steps S44 through S47, the proper degree of the similar image is obtained and informed to the management server 12.

In the steps S48 through S51, the communication e-mail corresponding to the proper degree is generated and sent to the Web site displaying the similar image.

In FIG. 23, the search server 11 circulates the research subject Web site group 30 of the related company and the like (step S52-2) and the image data included in eh research subject Web site 311 such as related company are searched for (step S53-2). The other steps are conducted similar to the first embodiment (FIG. 8 and FIG. 9).

FIG. 24 is a diagram showing an example of an agreement information management table for registering information concerning an agreement, according to the second embodiment of the present invention. In FIG. 24, the agreement information management table, for each company name contracting the use agreement of the trademark (that is, company name that received the user permit of the trademark), for example, items of a registered date, trademark information (shown by an identification number), agreement information (shown by an identification number), a valid term, image information (shown by an identification number), a URL, a counsel, a monitor, and a like are registered.

A trademark information management table is the same as that in the first embodiment (FIG. 10B), and a proper degree management table for managing information concerning the proper degree is the same the proper degree management table for managing information concerning the proper degree in the first embodiment (FIG. 10C).

A service login screen in the proper use research service providing system according to the second embodiment of the present invention is the same as the service login screen 40 in the illegal use research service providing system according to the first embodiment of the present invention (FIG. 12), and the explanation thereof will be omitted.

FIG. 25 is a diagram showing an example of a research condition setting screen in the proper use research service providing system according to the second embodiment of the present invention. In FIG. 25, the research condition setting screen 150 includes a registration setting 151 of the research subject image, a type registration setting 152 of the research subject image, a registration setting 153 of a file attribute, a registration setting 154 of the research Site, an estimate amount display 155, and a search start button 156. The research client can select the image data to be research subject by clicking "REFER" button of the registration setting 151 of the research subject image. In this example, image data 151a and 151a are selected image data. Furthermore, in a case in that the image data 151a and 151b are set to be search subject, each check box is checked. Only image data where the check box is checked become the research subject. When two images (image data 51a and 51b) are checked, "or" search is conducted.

Next, in the type registration setting 152 of the research subject image, a type of the image data requested to search (for example, a photograph, a company mark, a trademark, a logo, or a like) can be indicated. Moreover, it is possible to indicate a different color of a main element or indicate to ignore or a like.

Next, in the registration setting 153 of the file attribute, the format of the image data requested to search (for example, JPEG, GIF, PNG, or a like) can be indicated. Moreover, a capacity range of the image data requested to search (for example, 100 KB to 1000 KB, or a like) can be indicated. Furthermore, a size range of the image data requested to search (for example, length 100 dots × width 100 dots or a like) can be indicated.

The registration setting 54 of the research subject site is an item for checking to limit the research subject. In this case, it is possible to select a Web site, which is permitted to use the image data being the research subject by the use agreement between the organization of the research client and the related company. The research client can select a Web site to be the research subject by clicking a "REFER" button of the registration setting 154 of the research subject sites. Moreover, the research client can select a Web site managed by a distributor handling a product of the research client, which use the image data without the user permit but can be overlooked. The research client can select a Web site to be the research subject by clicking the "REFER" button of the registration setting 154 of the research subject site. When the research client registers a new research subject Web site, the research client can register from the registration setting 54 of the research subject site.

The estimate amount display 155 automatically calculates an estimate amount according to the proper use research based on the image data and the research condition.

The research client sets each item described above and then clicks the search start button 156 at the research condition setting screen 150. When the search start button 156 is clicked, the server system 10 starts the searching process for the similar image.

A search result displaying screen in the proper use research service providing system is similar to that in the illegal use research service providing system in the first embodiment (FIG. 14) and the explanation thereof will be omitted.

A communication e-mail creating form screen in the proper use research service providing system is similar to the waning/attention e-mail creating form screen in the illegal use research service providing system in the first embodiment (FIG. 15A and FIG. 15B) and the explanation thereof will be omitted.

Another search result displaying screen in the proper use research service providing system is similar to that in the illegal use research service providing system in the first embodiment (FIG. 16) and the explanation thereof will be omitted.

A further search result displaying screen in the proper use research service providing system is similar to that in the illegal use research service providing system in the first embodiment (FIG. 17) and the explanation thereof will be omitted.

In the second embodiment, each function realized in the proper use research service providing system or apparatus for image data are described. The present invention can be realized by a method for conducting each steps in the proper use research service providing system or apparatus. Moreover, similar to the proper use research service providing system or apparatus including each function, the present invention can be realized by a program for causing a computer to function as the proper use research service providing system or apparatus. Furthermore, the present invention can be realized by installing the program recorded in a computer-readable recording medium.

An embodiment of the computer-readable recording medium recording the program and data to realize the proper use research service providing function for the image data will be described according to the present invention. As the computer-readable recording medium, in detail, a CD-ROM (-R/-RW), a magneto-optical disk, a DVD-ROM, a FD (floppy disk), a flash memory, a memory card, a memory stick, and other various ROMs and RAMs can be used. It is possible to easily realize the proper use research service providing function by recording and distributing the program causing a computer to function as each system according to the second embodiment of the present invention and realizing the proper use research service providing function. Then, the program is installed from the computer-readable recording medium to a computer as an information processing apparatus, and read out the program by a CPU of the computer, so as to realize the proper use research served providing function. Alternatively, the program is recorded to the computer-readable recording medium mounted to the information processing apparatus, and read out the program if necessary, so as to realize the proper use research served providing function.

The present invention is not limited to the specifically disclosed embodiments, and variations and modifications may be made without departing from the scope of the present invention.

The present application is based on the Japanese Priority Applications No. 2003-185636 filed on Jun. 27, 2003, No. 2003-185690 filed on Jun. 27, 2003, No. 2004-151265 filed on May 21, 2004, and No. 2004-151474 filed on May 21, 2004, the entire contents of which are hereby incorporated by reference.

What is claimed is:

1. A system for providing an illegal use research service for image data, said system comprising:
    a server apparatus for conducting an illegal use research of the image data requiring a use permit; and
    a terminal apparatus used by a research client requesting the illegal use research, said terminal apparatus connectable to said server apparatus through a network,
    wherein said server apparatus includes:
    a research subject registering part registering the image data received from said terminal apparatus as a research subject to a research subject database for each research client;
    a research condition setting part setting a research condition for research whether or not the image data being registered is illegally used by a Web site on the network;
    a similar image searching part calculating a feature amount of the image data registered by said research subject registering part and searching for image data that are identical or similar to the image data being the research subject from a web site on the network based on the feature amount being calculated and the research condition; and
    a search result informing part informing a search result by the similar image searching part as a research report to the research client using said terminal apparatus.

2. The system as claimed in claim 1, wherein said similar image searching part calculates one or a plurality of the feature amounts of a color, a pattern, a shape, and a layout of image data set as a subject of the illegal use research.

3. The system as claimed in claim 1, wherein said research subject registering part registers information concerning a user and including Web site identification information of a Web site managed by the user who received the use permit of the image data with the image data set as a subject of the illegal use research and the feature amount of the image data, to the research subject database for each research client.

4. The system as claimed in claim 1, wherein said research condition setting part is capable of setting the research condition excluding the Web site managed by the use being registered in the research subject database from the research subject.

5. The system as claimed in claim 1, wherein said research condition setting part is capable of setting at least one of a data format, a data capacity, and a data size of the image data recognized as the subject of the illegal use research.

6. The system as claimed in claim 1, wherein said research condition setting part is capable of setting at least one of a domain type, a page type, and a page layer of the Web site recognized as the subject of the illegal use research.

7. The system as claimed in claim 1, wherein said similar image searching part is capable of setting a predetermined range for the feature amount of the image data being registered in the research subject when searching for image data which are identical or similar to the image data being research subject, searching for image data having the feature amount being within the predetermined range from image data included in the Web site on the network as a similar image, and obtaining the image data searched as the similar imaged and identification information of the Web site including the image data.

8. The system as claimed in claim 7, wherein:
said similar image searching part is capable of setting a similarity degree with respect to image data obtained as the similar image based on the feature amount of the image data; and
said search result informing part is capable of sorting image data in an order of a higher similarity degree when displaying and informing the search result at the terminal apparatus, and displaying the image data being sorted with image information including at least the identification information of the Web site including the image data and the similarity degree of the image data.

9. The system as claimed in claim 8, further comprising a text example database storing text examples showing different contents for a warning e-mail corresponding to the similarity degree set for each image data,
wherein said search result informing part includes a part sending the warning e-mail to the Web site including the similar image searched by the similar image searching part,
wherein when the warning e-mail is sent to the Web site including the similar image, said search result informing part selects one text example corresponding to the similarity degree of the similar image from the text example database, sets the selected text example to the waning e-mail, and sends the warning e-mail setting the selected text example to an e-mail address included in the Web site.

10. The system as claimed in claim 9, wherein said search result informing part sends the warning e-mail setting the selected text example from the text example database to the terminal apparatus of the research client before sending the warning e-mail to the e-mail address included in the Web site, and sends the warning e-mail to the e-mail address included in the Web site after the research client confirms or modifies contents of the warning e-mail.

11. The system as claimed in claim 1, wherein:
said server apparatus includes a feature amount registering part circulating a Web site on the network periodically, calculating the feature amount form the image data included in the Web site being circulated, and registering information concerning the feature amount being calculated to a feature amount database by associating the information with identification information of the Web site; and
said similar image searching part is capable of setting a predetermined range for the feature amount of the image data being registered in the search subject database when searching for image data being identical or similar to the image data being the research subject, searching for the feature amount being within the predetermined range from the feature amounts registered in the feature amount database, and obtaining the image data corresponding to the feature amount being searched and the identification information of the Web site including the image data as a search result.

12. The system as claimed in claim 1, wherein said research subject registering part registers a research history concerning image data as a subject of the illegal use research with the image data to the research subject database for each research client.

13. The system as claimed in claim 12, wherein said research subject registering part registers a number of sending the warning e-mail by said search result informing part for each Web site including the similar image searched by the similar image searching part.

14. The system as claimed in claim 12, wherein said search result informing part changes a warning message of the warning e-mail gradually by corresponding to the number of sending the warning e-mail registered by the research subject registering part.

15. The system as claimed in claim 1, wherein said server apparatus includes an estimate amount calculating part calculating an approximate estimate of an expense required for the illegal use research based on the research condition set by the research condition setting part, wherein before the similar image is searched by the similar image searching part, said server apparatus informs the approximate estimate to the research client, and conducts a similar image search when the research client approves the approximate estimate.

16. A program product embodied on a computer-readable medium for causing a computer to function as a system for providing an illegal use research service for image data, said program product comprising the codes for:
functioning as a server apparatus for conducting an illegal use research of the image data requiring a use permit; and
functioning as a terminal apparatus used by a research client requesting the illegal use research, including the codes for connecting to said server apparatus through a network,
wherein said functioning as said server apparatus includes the codes for:
registering the image data received from said terminal apparatus as a research subject to a research subject database for each research client;
setting a research condition for research whether or not the image data being registered is illegally used by a Web site on the network;
calculating a feature amount of the image data registered by registering the image data and searching for image data that are identical or similar to the image data being the research subject from a web site on the network based on the feature amount being calculated and the research condition; and
informing a search result by the similar image searching part as a research report to the research client using said terminal apparatus.

17. A system for providing a proper use research service for image data, said system comprising:
- a server apparatus for conducting a proper use research for researching whether or not image data being permitted to use is properly used; and
- a terminal apparatus used by a research client requesting the proper use research, said terminal apparatus connectable to said server apparatus through a network, wherein said server apparatus includes:
- a research subject registering part registering image data received as a research subject from the terminal apparatus and identification information of a Web site managed by a user who received a user permit of the image data for each research client to a research subject database;
- a research condition setting part setting a research condition for researching whether or not the image data being registered is properly used at a research subject Web site registering the identification information;
- a similar image searching part calculating a feature amount of the image data registered by the research subject registering part and searching for image data being identical or similar to the image data being the research subject based on the calculated feature amount and the research condition from the research subject Web site on the network; and
- a search result informing part informing a search result by said similar image searching part as a research report to the research client using the terminal apparatus.

18. The system as claimed in claim 17, wherein said similar image searching part calculates one or a plurality of the feature amounts of a color, a pattern, a shape, and a layout of image data set as a subject of the illegal use research.

19. The system as claimed in claim 17, wherein said research condition setting part is capable of setting at least one of a data format, a data capacity, and a data size of the image data recognized as the subject of the illegal use research.

20. The system as claimed in claim 17, wherein said research condition setting part is capable of setting at least one of a domain type, a page type, and a page layer of the Web site recognized as the subject of the illegal use research.

21. The system as claimed in claim 17, wherein said research subject registering part registers use agreement information concerning a use agreement of the image data contracted between the research client and the user who received the user permit from the research client, to the research subject database, and said similar image searching part includes a checking part checking whether or not image data included in the research subject Web site on the network is used in accordance with the contract contents regulated in the use agreement information.

22. The system as claimed in claim 17, wherein said similar image searching part is capable of setting a predetermined range for the feature amount of the image data being registered in the research subject when searching for image data which are identical or similar to the image data being research subject, searching for image data having the feature amount being within the predetermined range from image data included in the research subject Web site on the network as a similar image, and specifying the image data searched as the similar imaged and identification information of the research subject Web site including the image data.

23. The system as claimed in claim 22, wherein:
said similar image searching part is capable of setting a proper degree with respect to image data obtained as the similar image based on the feature amount of the image data; and said search result informing part is capable of sorting image data in an order of a higher proper degree when displaying and informing the search result at the terminal apparatus, and displaying the image data being sorted with image information including at least one of the identification information of the research subject Web site, the proper degree of the image data, and comment information concerning the image data.

24. The system as claimed in claim 23, further comprising a text example database storing text examples showing different contents for a communication e-mail corresponding to the proper degree set for each image data,
wherein said search result informing part includes a part sending the communication e-mail to the research subject Web site including the similar image searched by the similar image searching part,
wherein when the communication e-mail is sent to the research subject Web site including the similar image, said search result informing part selects one text example corresponding to the proper degree of the similar image from the text example database, sets the selected text example to the communication e-mail, and sends the communication e-mail setting the selected text example to an e-mail address included in the research subject Web site.

25. The system as claimed in claim 24, wherein said search result informing part sends the communication e-mail setting the selected text example from the text example database to the terminal apparatus of the research client before sending the communication e-mail to the e-mail address included in the research subject Web site, and sends the communication e-mail to the e-mail address included in the research subject Web site after the research client confirms or modifies contents of the communication e-mail.

26. The system as claimed in claim 17, wherein:
said server apparatus includes a feature amount registering part circulating a research subject Web site on the network periodically, calculating the feature amount form the image data included in the research subject Web site being circulated, and registering information concerning the feature amount being calculated to a feature amount database by associating the information with identification information of the research subject Web site; and
said similar image searching part is capable of setting a predetermined range for the feature amount of the image data being registered in the search subject database when searching for image data being identical or similar to the image data being the research subject, searching for the feature amount being within the predetermined range from the feature amounts registered in the feature amount database, and specifying the image data corresponding to the feature amount being searched and the identification information of the research subject Web site including the image data as a search result.

27. The system as claimed in claim 17, wherein said research subject registering part registers a research history concerning image data as a subject of the proper use research with the image data to the research subject database for each research client.

28. The system as claimed in claim 27, wherein said research subject registering part registers a number of sending the communication e-mail by said search result informing part for each research subject Web site including the similar image searched by the similar image searching part.

29. The system as claimed in claim 27, wherein said search result informing part changes a communication message of the communication e-mail gradually by corresponding to the number of sending the communication e-mail registered by the research subject registering part.

30. The system as claimed in claim 17, wherein said server apparatus includes an estimate amount calculating part calculating an approximate estimate of an expense required for the proper use research based on the research condition set by the research condition setting part, wherein before the similar image is searched by the similar image searching part, said server apparatus informs the approximate estimate to the research client, and conducts a similar image search when the research client approves the approximate estimate.

31. A program product embodied on a computer-readable medium for causing a computer to function as a system for providing a proper use research service for image data, said program product comprising the codes for:
- functioning as a server apparatus for conducting a proper use research for researching whether or not image data being permitted to use is properly used; and
- functioning as a terminal apparatus used by a research client requesting the proper use research, including the codes for connecting to said server apparatus through a network,
- wherein said functioning as said server apparatus includes the codes for: registering part registering image data received as a research subject from the terminal apparatus and identification information of a Web site managed by a user who received a user permit of the image data for each research client to a research subject database;
- setting a research condition for researching whether or not the image data being registered is properly used at a research subject Web site registering the identification information;
- calculating a feature amount of the image data registered by the research subject registering part and searching for image data being identical or similar to the image data being the research subject based on the calculated feature amount and the research condition from the research subject Web site on the network; and
- informing a search result by said similar image searching part as a research report to the research client using the terminal apparatus.

32. A computer-readable recording medium recorded with a program for causing a computer to function as a system for providing a proper use research service for image data, said program product comprising the codes for:
- functioning as a server apparatus for conducting a proper use research for researching whether or not image data being permitted to use is properly used; and
- functioning as a terminal apparatus used by a research client requesting the proper use research, including the codes for connecting to said server apparatus through a network,
- wherein said functioning as said server apparatus includes the codes for:
- registering part registering image data received as a research subject from the terminal apparatus and identification information of a Web site managed by a user who received a user permit of the image data for each research client to a research subject database;
- setting a research condition for researching whether or not the image data being registered is properly used at a research subject Web site registering the identification information;
- calculating a feature amount of the image data registered by the research subject registering part and searching for image data being identical or similar to the image data being the research subject based on the calculated feature amount and the research condition from the research subject Web site on the network; and
- informing a search result by said similar image searching part as a research report to the research client using the terminal apparatus.

* * * * *